US010872393B2

(12) United States Patent
Redgrave et al.

(10) Patent No.: US 10,872,393 B2
(45) Date of Patent: Dec. 22, 2020

(54) IMAGE PROCESSOR WITH HIGH THROUGHPUT INTERNAL COMMUNICATION PROTOCOL

(71) Applicant: Google LLC, Mountain View, CA (US)

(72) Inventors: Jason Redgrave, Mountain View, CA (US); Albert Meixner, Mountain View, CA (US); Qiuling Zhu, Santa Clara, CA (US); Ji Kim, Mountain View, CA (US); Artem Vasilyev, Stanford, CA (US); Ofer Shacham, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 12 days.

(21) Appl. No.: 15/595,242

(22) Filed: May 15, 2017

(65) Prior Publication Data

US 2018/0330465 A1   Nov. 15, 2018

(51) Int. Cl.
*G06T 1/20* (2006.01)
*G06F 12/0813* (2016.01)
*H04L 25/40* (2006.01)
*G06F 15/80* (2006.01)

(52) U.S. Cl.
CPC .......... *G06T 1/20* (2013.01); *G06F 12/0813* (2013.01); *G06F 15/8023* (2013.01); *H04L 25/40* (2013.01)

(58) Field of Classification Search
CPC ... G06F 15/8023; G06F 12/0813; H04L 25/40
See application file for complete search history.

(56) References Cited

U.S. PATENT DOCUMENTS

| 7,453,878 B1 * | 11/2008 | Martin | H04L 45/24 370/394 |
| 7,478,811 B2 | 1/2009 | Johnson | |
| 9,489,322 B2 | 11/2016 | Wagh et al. | |
| 2008/0005274 A1 * | 1/2008 | Subbanna | H04L 47/323 709/218 |
| 2009/0019190 A1 * | 1/2009 | Blocksome | G06F 9/546 710/25 |
| 2011/0078689 A1 | 3/2011 | Shebanow et al. | |
| 2017/0235497 A1 * | 8/2017 | Shih | H03M 7/30 711/154 |

(Continued)

OTHER PUBLICATIONS

Concer et al. "CTC: an End-to-End Flow Control Protocol for Multi-Core Systems-on-Chip," Proceedings of the 3rd ACM/IEEE International Symposium on Networks-on-Chips, IEEE Computer Society, May 2009, 10 pages.

(Continued)

*Primary Examiner* — Tuan V Thai
*Assistant Examiner* — Edward Waddy, Jr.
(74) *Attorney, Agent, or Firm* — Fish & Richardson P.C.

(57) ABSTRACT

A processor is described. The processor includes a network. A plurality of processing cores are coupled to the network. The processor includes a transmitter circuit coupled to the network. The transmitter circuit is to transmit output data generated by one of the processing cores into the network. The transmitter circuit includes control logic circuitry to cause the transmitter circuit to send a request for transmission of a second packet of output data prior to completion of the transmitter circuit's transmission of an earlier first packet of output data.

15 Claims, 31 Drawing Sheets

(56) References Cited

U.S. PATENT DOCUMENTS

2018/0189104 A1* 7/2018 Agarwal ................. G06F 9/505
2018/0288145 A1* 10/2018 Levy ..................... H04L 49/501

OTHER PUBLICATIONS

Intel. "An Introduction to the Intel QuickPath Interconnect," Intel: Document No. 320412-001US, Jan. 2009, 22 pages.
Kang et al. "Fault-Tolerant Flow Control in On-Chip Networks," 2010 Fourth ACM/IEEE International Symposium on Networks-on-Chip, May 2010, 8 pages.
Kumar et al. "Token flow control," Proceedings of the 41$^{st}$ annual IEEE/ACM International Symposium on Microarchitecture, IEEE Computer Society, Nov. 2008, 12 pages.
Peh et al. "Chapter 2: On-Chip Networks for Multicore Systems," Multicore Processors and Systems, Integrated Circuits and Systems, Springer Science+Business Media, LLC, 2009, 38 pages.
Datta et al. "Stencil computation optimization and auto-tuning on state-of-the-art multicore architectures," International Conference for High Performance Computing, Networking Storage and Analysis, Nov. 15, 2008, 12 pages.
International Search Report and Written Opinion issued in International Application No. PCT/US2018012521, dated Apr. 19, 2018, 15 pages.
Werner et al. "Optimized Stencil Computation Using In-Place Calculation on Modern Multicore Systems," Aug. 25, 2009, ECCV 2016 Conference, Lecture Notes in Computer Science, Springer International Publishing, 13 pages.
TW Office Action issued in Taiwanese Application No. 107104241, dated Jan. 9, 2019, 9 pages (with English translation).
PCT International Preliminary Report on Patentability issued in International Application No. PCT/US2018012521, dated Nov. 19, 2019, 8 pages.
TW Office Action in Taiwan Application No. 107104241, dated May 5, 2020, 13 pages (with English translation).

* cited by examiner

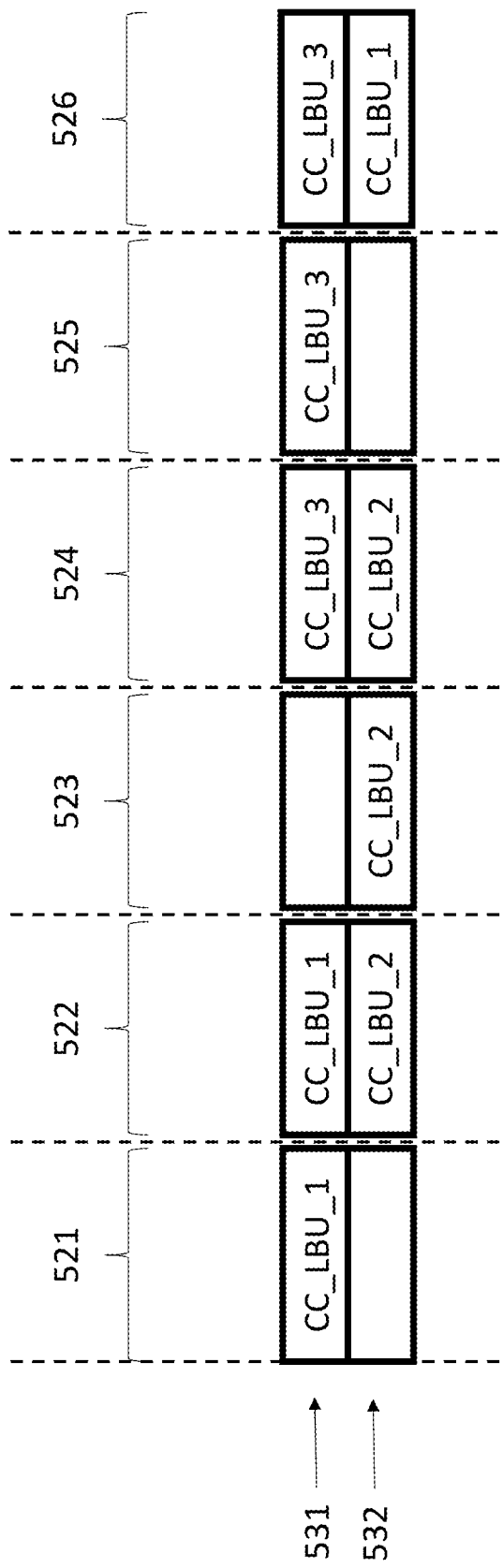

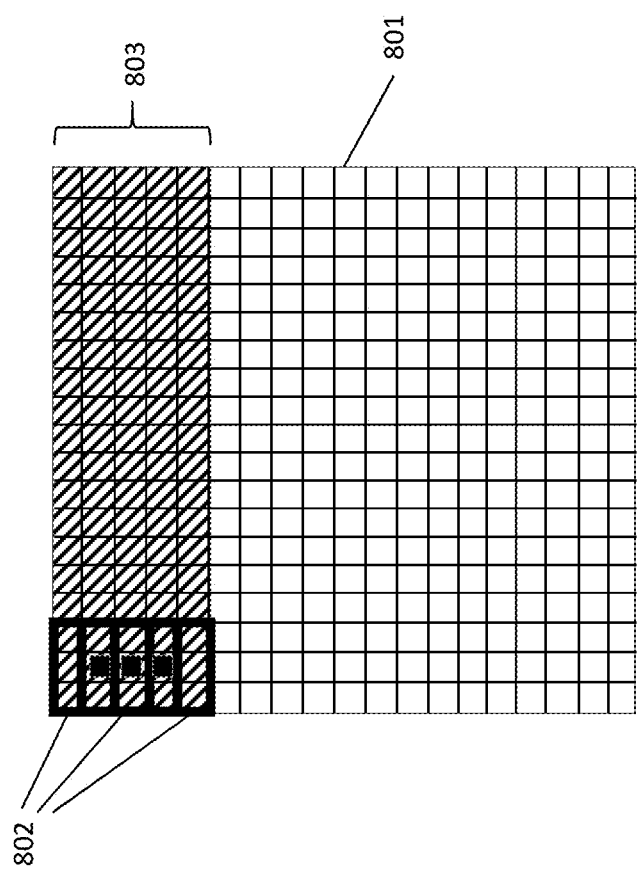

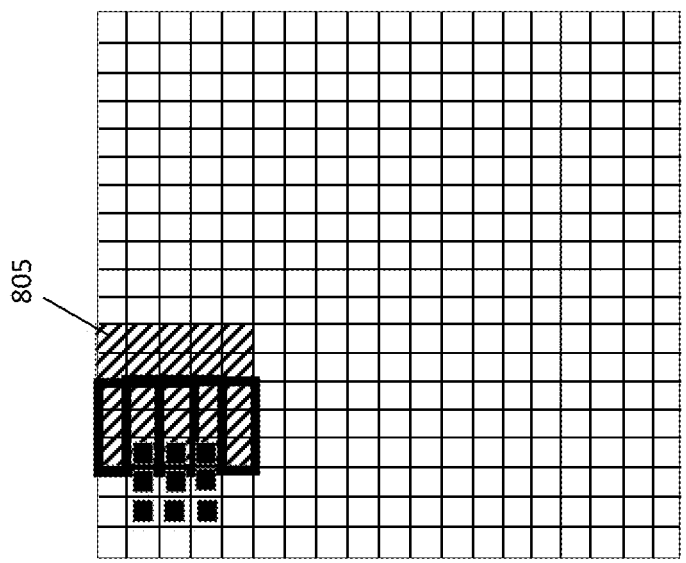

```
// thread X1: process stencil 1 //
shift down 1
shift right 1
load // put A in R1
shift left 1
R1 <= ADD R1, R2 // add A, B // thread X2: process stencil 2 //
shift down 1
shift right 1
load // put F in R1
shift left 1
R1 <= ADD R1, R2 // add F, G
```

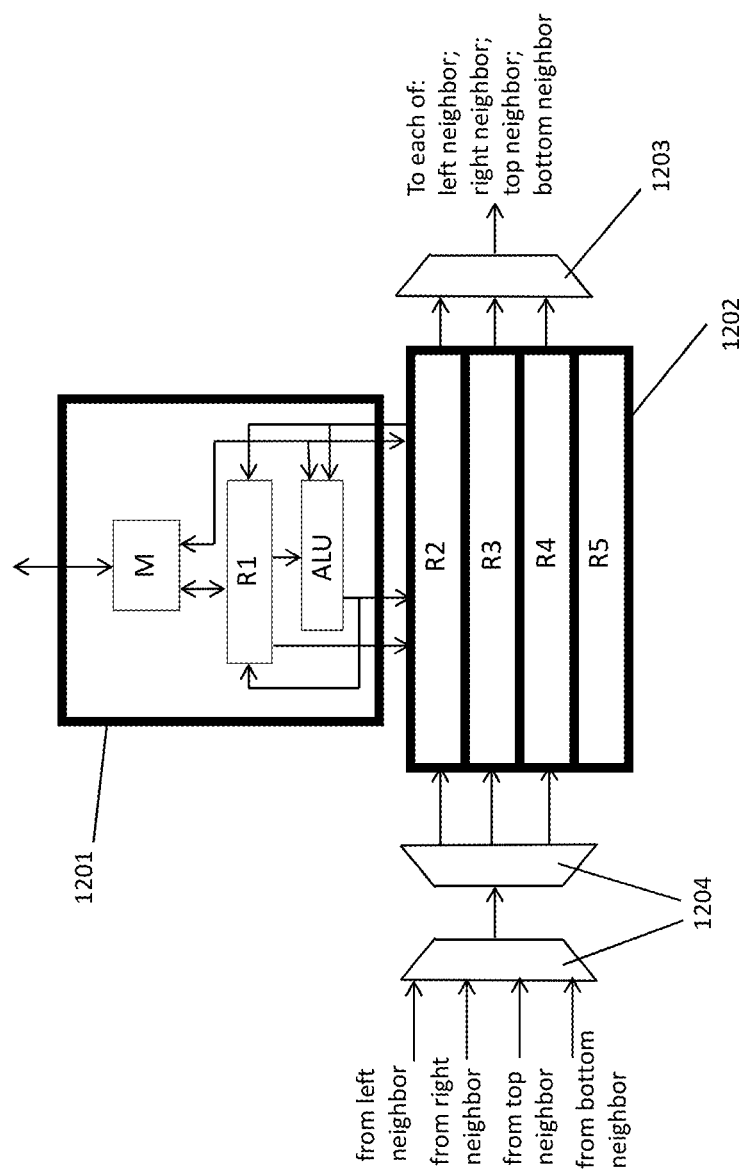

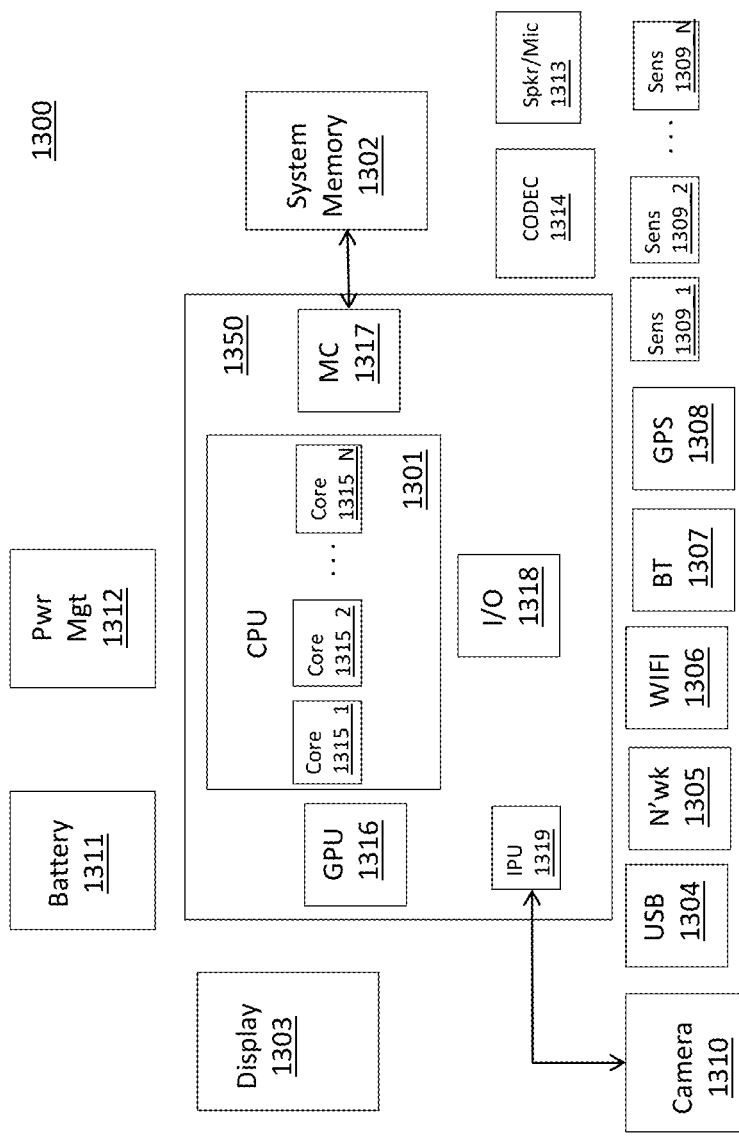

IMAGE PROCESSOR WITH HIGH THROUGHPUT INTERNAL COMMUNICATION PROTOCOL

FIELD OF INVENTION

The field of invention pertains generally to the computing sciences and, more specifically, to an image processor with a high throughput internal communication protocol.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hardwired circuitry to much larger units of data. The use of larger (as opposed to finer grained) units of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

A processor is described. The processor includes a network. A plurality of processing cores are coupled to the network. The processor includes a transmitter circuit coupled to the network. The transmitter circuit is to transmit output data generated by one of the processing cores into the network. The transmitter circuit includes control logic circuitry to cause the transmitter circuit to send a request for transmission of a second packet of output data prior to completion of the transmitter circuit's transmission of an earlier first packet of output data.

FIGURES

The following description and accompanying drawings are used to illustrate embodiments of the invention. In the drawings:

FIG. 5c shows counter usage behavior during a communication flow;

FIGS. 8a, 8b, 8c, 8d and 8e depict the parsing of image data into a line group, the parsing of a line group into a sheet and the operation performed on a sheet with overlapping stencils;

FIG. 12 shows an embodiment of a unit cell for an integrated execution lane array and two-dimensional shift array;

FIG. 13 shows an exemplary computing system.

DETAILED DESCRIPTION

1.0 Unique Image Processor Architecture

As is known in the art, the fundamental circuit structure for executing program code includes an execution stage and register space. The execution stage contains the execution units for executing instructions. Input operands for an instruction to be executed are provided to the execution stage from the register space. The resultant that is generated from the execution stage's execution of an instruction is written back to the register space.

Execution of a software thread on a traditional processor entails sequential execution of a series of instructions through the execution stage. Most commonly, the operations are "scalar" in the sense that a single resultant is generated from a single input operand set. However in the case of "vector" processors, the execution of an instruction by the execution stage will generate a vector of resultants from a vector of input operands.

Figure 1:
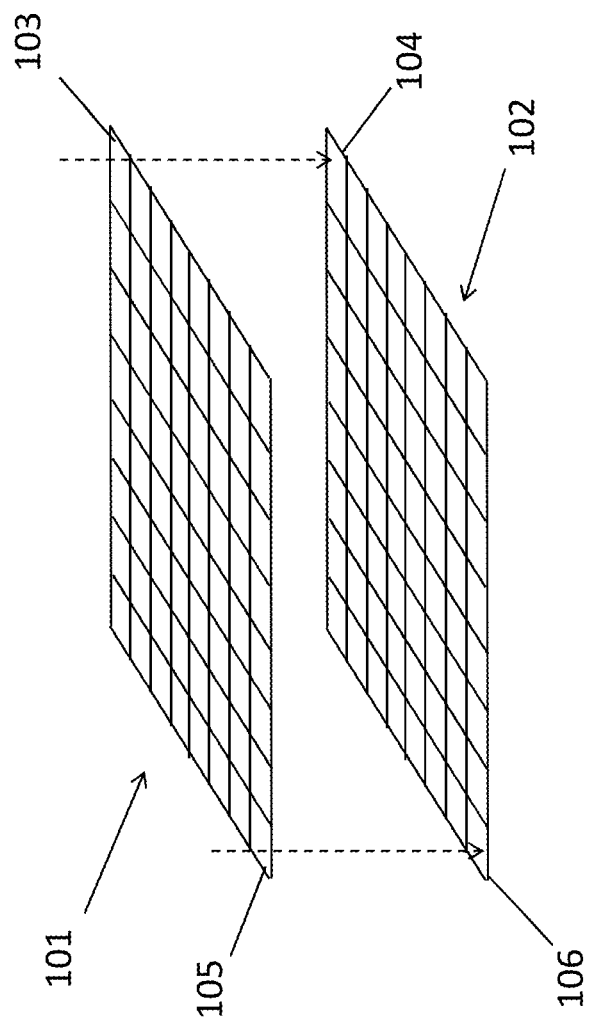
FIG. 1 shows a high level view of a stencil processor architecture.

FIG. 1 shows a high level view of a unique image processor architecture 100 that includes an array of execution lanes 101 coupled to a two-dimensional shift register array 102. Here, each execution lane in the execution lane array can be viewed as a discrete execution stage that contains the execution units needed to execute the instruction set supported by the processor 100. In various embodiments each execution lane receives a same instruction to execute in a same machine cycle so that the processor operates as a two dimensional single instruction multiple data (SIMD) processor.

Each execution lane has its own dedicated register space in a corresponding location within the two dimensional shift register array 102. For example, corner execution lane 103 has its own dedicated register space in corner shift register location 104, corner execution lane 105 has its own dedicated register space in corner shift register location 106, etc.

Additionally, the shift register array 102 is able to shift its contents so that each execution lane is able to directly operate, from its own register space, upon a value that was resident in another execution lane's register space during a prior machine cycle. For example, a +1 horizontal shift causes each execution lane's register space to receive a value from its leftmost neighbor's register space. On account of an ability to shift values in both left and right directions along a horizontal axis, and shift values in both up and down directions along a vertical axis, the processor is able to efficiently process stencils of image data.

Here, as is known the art, a stencil is a slice of image surface area that is used as a fundamental data unit. For example, a new value for a particular pixel location in an output image may be calculated as an average of the pixel values in an area of an input image that the particular pixel location is centered within. For example, if the stencil has a dimension of 3 pixels by 3 pixels, the particular pixel location may correspond to the middle pixel of the 3×3 pixel array and the average may be calculated over all nine pixels within the 3×3 pixel array.

According to various operational embodiments of the processor 100 of FIG. 1, each execution lane of the execution lane array 101 is responsible for calculating a pixel value for a particular location in an output image. Thus, continuing with the 3×3 stencil averaging example mentioned just above, after an initial loading of input pixel data and a coordinated shift sequence of eight shift operations within the shift register, each execution lane in the execution lane array will have received into its local register space all nine pixel values needed to calculate the average for its corresponding pixel location. That is, the processor is able to simultaneously process multiple overlapping stencils centered at, e.g., neighboring output image pixel locations. Because the processor architecture of FIG. 1 is particularly adept at processing over image stencils it may also be referred to as a stencil processor.

Figure 2:
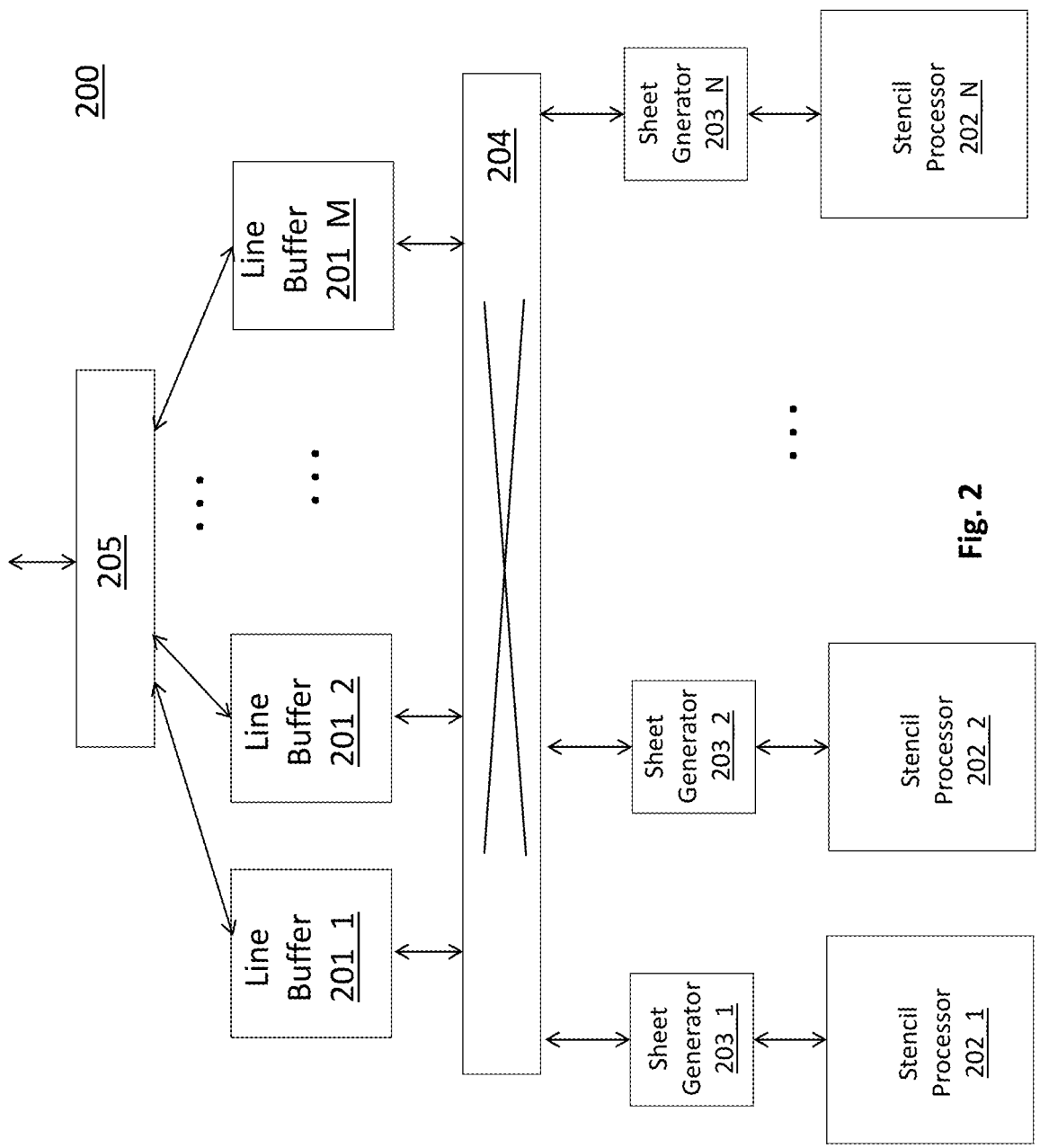
FIG. 2 shows a more detailed view of an image processor architecture.

FIG. 2 shows an embodiment of an architecture 200 for an image processor having multiple stencil processors 202_1 through 202_N. As such, the image processor may be referred to a multi-core processor where the individual stencil processors may be more generally characterized as image processing cores, processing cores, processor cores, cores or other like term. As observed in FIG. 2, the architecture 200 includes a plurality of line buffer units 201_1 through 201_M interconnected to a plurality of stencil processor units 202_1 through 202_N and corresponding sheet generator units 203_1 through 203_N through a network 204 (e.g., a network on chip (NOC) including an on chip switch network, an on chip ring network or other kind of network). In an embodiment, any line buffer unit 201_1 through 201_M may connect to any sheet generator 203_1 through 203_N and corresponding stencil processor 202_1 through 202_N through the network 204.

Program code is compiled and loaded onto a corresponding stencil processor 202 to perform the image processing operations earlier defined by a software developer (program code may also be loaded onto the stencil processor's associated sheet generator 203, e.g., depending on design and implementation). In at least some instances an image processing pipeline may be realized by loading a first kernel program for a first pipeline stage into a first stencil processor 202_1, loading a second kernel program for a second pipeline stage into a second stencil processor 202_2, etc. where the first kernel performs the functions of the first stage of the pipeline, the second kernel performs the functions of the second stage of the pipeline, etc. and additional control flow methods are installed to pass output image data from one stage of the pipeline to the next stage of the pipeline.

In other configurations, the image processor may be realized as a parallel machine having two or more stencil processors 202_1, 202_2 operating the same kernel program code. For example, a highly dense and high data rate stream of image data may be processed by spreading frames across multiple stencil processors each of which perform the same function.

In yet other configurations, essentially any directed acyclic graph (DAG) of kernels may be loaded onto the image processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 205 and passed to one or more of the line buffer units 201 on a frame by frame basis. A particular line buffer unit parses its frame of image data into a smaller region of image data, referred to as a "line group", and then passes the line group through the network 204 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 201_1 which parses the image data into line groups and directs the line groups to the sheet generator 203_1 whose corresponding stencil processor 202_1 is executing the code of the first kernel in the pipeline/DAG. Upon completion of operations by the stencil processor 202_1 on the line groups it processes, the sheet generator 203_1 sends output line groups to a "downstream" line buffer unit 201_2 (in some use cases the output line group may be sent_back to the same line buffer unit 201_1 that earlier had sent the input line groups).

One or more "consumer" kernels that represent the next stage/operation in the pipeline/DAG executing on their own respective other sheet generator and stencil processor (e.g., sheet generator 203_2 and stencil processor 202_2) then receive from the downstream line buffer unit 201_2 the image data generated by the first stencil processor 202_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

As alluded to above with respect to FIG. 1, each stencil processor 202_1 through 202_N is designed to simultaneously operate on multiple overlapping stencils of image data. The multiple overlapping stencils and internal hardware processing capacity of the stencil processor effectively determines the size of a sheet. Again, as discussed above, within any of stencil processors 202_1 through 202_N, arrays of execution lanes operate in unison to simultaneously process the image data surface area covered by the multiple overlapping stencils.

Additionally, in various embodiments, sheets of image data are loaded into the two-dimensional shift register array of a stencil processor 202 by that stencil processor's corresponding (e.g., local) sheet generator 203. The use of sheets and the two-dimensional shift register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable. More details concerning the operation of the line buffer units, sheet generators and stencil processors are provided further below in Section 3.0.

Figure 3:
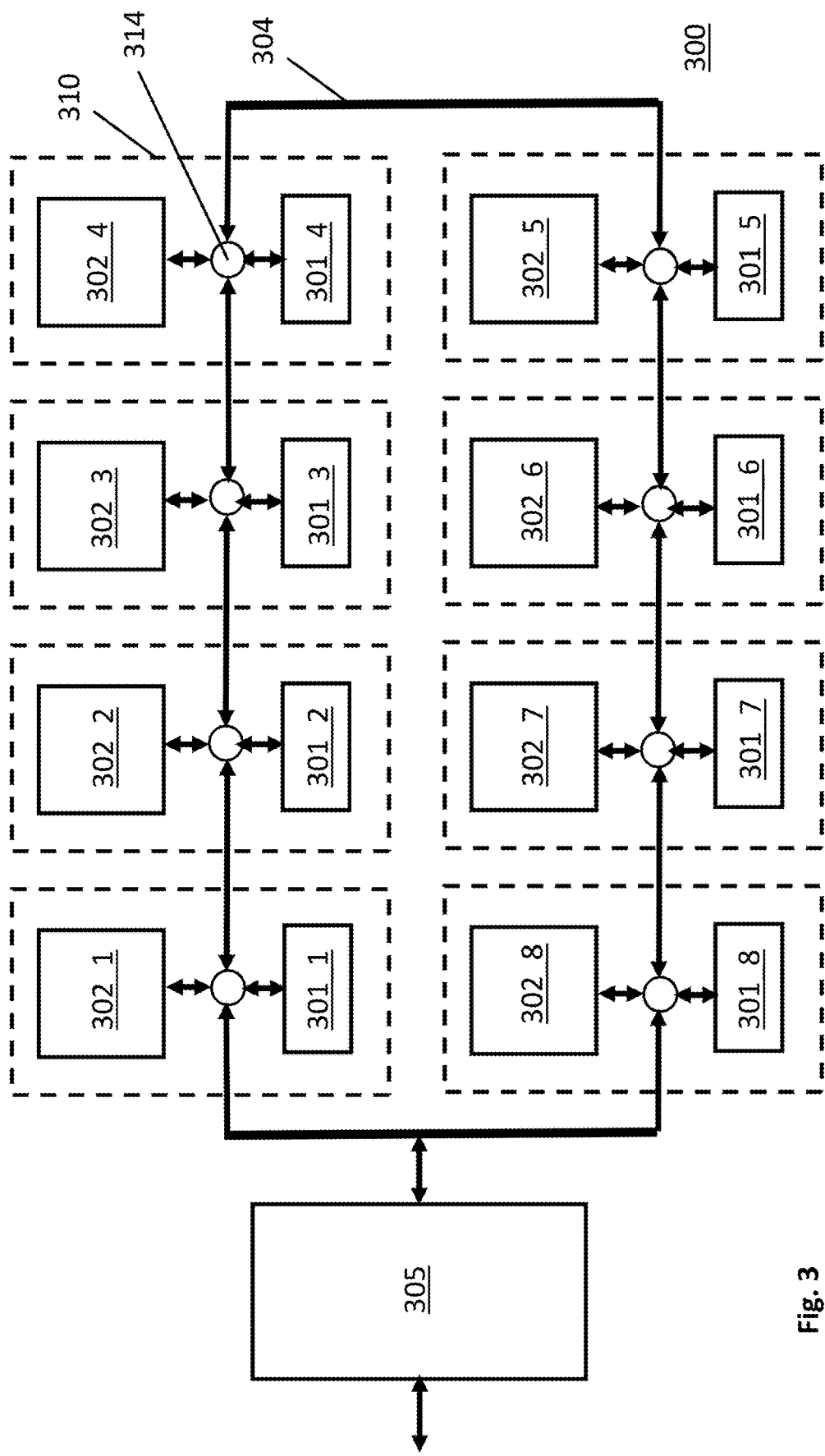
FIG. 3 shows an even more detailed view of an image processor architecture.

FIG. 3 shows a more detailed embodiment of a specific hardware implementation of the image processor of FIG. 2. As observed in FIG. 3, the network 204 of FIG. 2 is implemented in a ring topology 304 with a 4×4 network node 314 at each intersection between a line buffer unit 301 and sheet generator/stencil processor core 302. For simplicity, FIG. 3 only labels the network node 314 that resides between line buffer unit 301_4 and sheet generator/stencil processor core 302_4.

Here, each of sheet generator/stencil processor cores 302_1 through 302_8 are understood to include both a stencil processor and its corresponding sheet generator. For simplicity, each of the sheet generator/stencil processor cores 302_1 through 302_8 will hereinafter be referred to simply as a stencil processor core or core. Although eight line buffer units 301_1 through 301_8 and eight cores 302_1 through 402_8 are depicted in the particular embodiment of FIG. 3 it should be understood that different architectures are possible having different numbers of line buffer units and/or cores. Network topologies other than a ring topology are also possible.

With respect to the image processor of FIG. 3, the ring network 304 permits: 1) the I/O unit 305 to pass input data to any line buffer unit 301_1 through 301_8 (or any core 302_1 through 302_8); 2) any line buffer unit 301_1 to 301_8 to forward a line group to any core 302_1 through 302_8; 3) any core 302_1 through 302_8 to pass its output data to any line buffer unit 301_1 through 301_8; and, 4) any line buffer unit 301_1 through 301_8 to pass image processor output data to I/O unit 305. As such, a wealth of different software kernel loading options and internal network configurations are possible. That is, theoretically, for any software application composed of multiple kernels to be executed on the various cores 302 of the processor, any kernel can be loaded onto any core and any line buffer unit can be configured to source/sink input/output data to/from any core.

Figure 4:
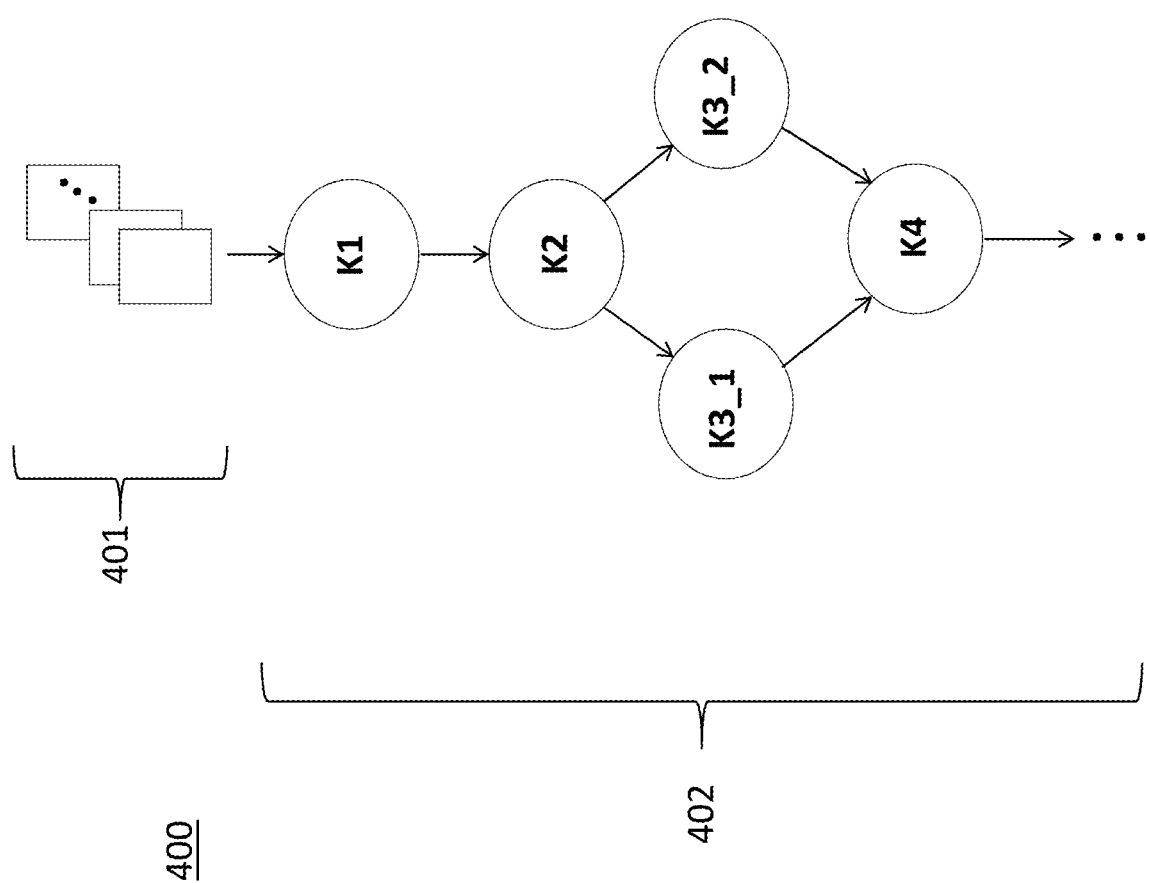
FIG. 4 shows an application software program that can be executed by an image processor.

FIG. 4 shows an exemplary application software program or portion thereof that may be loaded onto the image processor of FIG. 3. As observed in FIG. 4, the program code may be expected to process one or more frames of input image data 401 to effect some overall transformation on the input image data 401. The transformation is realized with the operation of one or more kernels of program code 402 that operate on the input image data in an orchestrated sequence articulated by the application software developer.

In the example of FIG. 4, the overall transformation is effected by first processing each input image with a first kernel K1. The output images produced by kernel K1 are then operated on by kernel K2. Each of the output images produced by kernel K2 are then operated on by kernel K3_1 or K3_2, The output images produced by kernel(s) K3_1/K3_2 are then operated on by kernel K4. In the particular example of FIG. 3, Kernels K3_1 and K3_2 may be, e.g., different kernels that perform different image processing operations (e.g., kernel K3_1 operates on input images of a first specific type and kernel K3_2 operates on input images of a second, different type).

For simplicity only four kernels K1 through K4 are shown. In reference to the image processor hardware architecture embodiment of FIG. 3, note that, in a basic configuration where each kernel operates on a different stencil processor, conceivably, four more kernels may flow from kernel K4 before all the cores 302 of the processor have a corresponding kernel (the four kernel flow of FIG. 4 only utilizes half the cores of the processor of FIG. 3).

2.0 Transceiver that Efficiently Implements Transactions

As described above, a producing kernel of program code that is executing on one stencil processor sends its output data (e.g., as groups of lines) to a line buffer unit. The line buffer unit queues or otherwise stores and forwards the data (e.g., also as groups of lines) to one or more other stencil processors that are executing respective kernels of program code that consume the producing kernel's output data. Within the overall image processor there are multiple stencil processors interconnected to multiple line buffer units so that, e.g., a large number of producing/consuming kernel connections may be implemented.

In various embodiments the store and forward queue for a particular producing/consuming kernel relationship may be referred to as a "buffer" or "line buffer" while a "line buffer unit" is a hardware component that can concurrently support multiple buffers. Here, the line buffer unit may include memory resources and associated logic. The different buffers supported by the line buffer unit are allocated different portions of the memory resources for their respective store and forward activity.

The image processor's internal network supports the various producing kernel to line buffer unit communications/connections and the various line buffer unit to consuming kernel communications/connections that are concurrently in existence within the image processor. Here, in an embodiment, each stencil processor includes a transceiver composed of a transmitter and a receiver that is coupled to the internal network. Likewise, each line buffer unit includes a transceiver that is coupled to the internal network.

With the potentially heavy amounts of traffic that may be offered to the internal network at any one time by the combination of stencil processors and line buffer units, in various embodiment, a credit control mechanism is utilized to prevent overload of any resources within the image processor (including the network and/or other resources such as the memory resources of the line buffer units and/or local memory resources of the stencil processors).

For example, in one embodiment, in order to prevent overload of the line buffer unit memory resources and/or network for communications from a producing stencil processor (a stencil processor that is executing a producing kernel, hereinafter, a sending processor) to a line buffer unit, a credit control mechanism is implemented in each of the line buffer units to control the flow of output image data from a producing kernel to its associated line buffer unit. Here, the line buffer unit maintains control over a number of credits and issues credits to a sending processor that desires to send output image data to the line buffer unit. Each credit corresponds to an amount of data that can be sent by the sending processor.

As such, the sending processor is only able to send an amount of data that corresponds to the number of credits it has. As the stencil processor actually sends its output data to the line buffer unit, it depletes it credit count a corresponding amount. For example, if each credit corresponds to 1 MB of data, the sending processor reduces its credit amount by 1 with each 1 MB of data that it sends to the line buffer unit (note that in an actual processor implementation the packets and corresponding data transfers are much finer grained, e.g., each packet is typically tens of bytes or hundreds of bytes and each credit corresponds to tens of bytes (e.g., 32 bytes)). The line buffer unit may continue to send additional credits to the sending processor (e.g., as resources free up within the line buffer unit) so that the sending processor can continue to send data. If at any time, however, the sending processor's credit count is depleted to zero, it cannot send any more data to the line buffer unit until it receives additional credit from the line buffer unit.

Figure 5A:
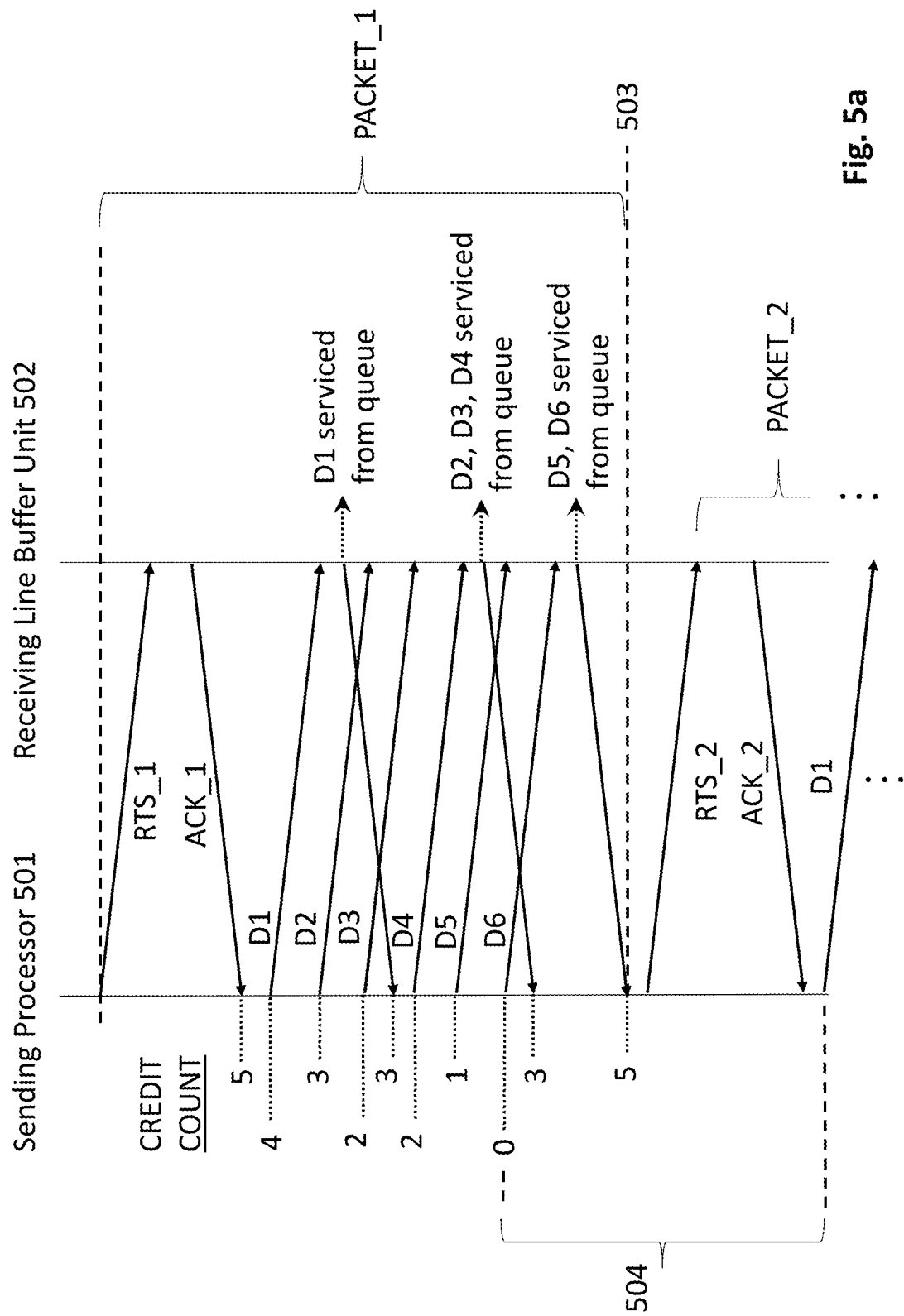
FIG. 5a shows a first communication sequence.

FIG. 5a shows an exemplary scenario of a prior design that operates according to the principles described above. Here, the line buffer unit 502 includes an internal queue (not shown in FIG. 5a for simplicity) of fixed size in which to hold units of data that have been received from the sending processor 501. In particular, assume the queue has N=5 entries where each entry can hold a specific amount of data (e.g., M bytes). In a basic configuration, the sending processor 501 sends one or more data units of M bytes each in a particular communication session or "connection" with the line buffer unit 502 (e.g., the sending of a packet that contains multiple data units of M bytes each). Each time the sending processor 501 sends a next data unit of M bytes to the line buffer unit 502, the next data unit is entered in the queue.

When an M byte data unit is serviced from the queue (e.g., because the line buffer unit 502 is able to write it into its memory resources), the line buffer unit 502 sends one credit to the sending processor 501. Here, the servicing of the M byte data unit from the queue essentially frees one queue entry which can be filled with a next M byte unit sent from the sending processor 501. If, e.g., the line buffer unit 502 is able to rapidly service multiple M byte units from the queue a corresponding credit amount is sent back to the sending processor 501. For example if the line buffer unit 502 rapidly services three M bytes units from the queue, the line buffer unit 502 sends three credits back to the sending processor 501.

Thus, referring to FIG. 5a, in an initial state, the sending processor 501 sends a request to send request RTS_1 to the line buffer unit 502 when, e.g., it has a next packet of output image data to send to the line buffer unit 502. The line buffer unit queue is initially empty and therefore, in granting the request with an acknowledgement ACK_1, the line buffer unit 502 sends an amount of credits equal to the size of the queue (N=5). The sending processor 501 then begins to send a number of M byte data units in succession D1, D2, . . . . The depleting of the processor's credit count from the sending of the data units is depicted on the processor side of the scenario of FIG. 5a.

On the line buffer unit 502 side, the line buffer unit 502 receives the M data units from the sending processor 501 in succession, enters them in the queue when received and services them from the queue in accordance with the line buffer unit's capabilities (e.g., to write them into memory). With each servicing of an M byte data unit from the queue, the line buffer unit 502 sends an additional credit to the sending processor 501 which adds the newly received credit to its credit count.

Eventually, the sending processor will have sent all the M byte data units for the current connection (e.g., all M byte data units of a packet have been sent). In the scenario of FIG. 5a, the current connection is assumed to consist of 6 M byte data units (e.g., the packet is composed of 6 M byte data units). As such, the sending processor 501 has sent its last data unit for the packet with the sending of the D6 data unit. Further still, eventually, the line buffer unit 502 will have serviced all of the M byte units from its queue and sent corresponding credits back to the sending processor 501. As such, the sending processor 501 will recognize completion of the connection when it has sent all of the data units for the session and its credit count is equal to the size of the line buffer unit's queue (N=5). Here, although the sending processor 501 has a full set of credits, it is not permitted to use them, e.g., for a second following packet, because it has not yet sent a request nor received any acknowledgement for such a following packet.

In the prior design of FIG. 5a, if the sending processor 501 has another packet to send to the line buffer unit 502 prior to completion of the current session (e.g., while sending the data units of the first packet of the scenario) it can only send the request for the second following packet after the sending of the prior packet is deemed complete. As stated above, a connection is not deemed complete by the sending processor until it has sent all the data for the connection and its credit count amount is equal to the size of the line buffer unit queue (N=5).

A problem with this approach is the amount of time 504 that can be wasted in between the sending of a last data unit of an earlier packet and the sending of a first data unit of a subsequent packet. Here, as observed in FIG. 5a, note that the sending of the first packet is completed as of the sending of the D6 data unit, but the connection is not deemed complete until time 503. The wasted time 504 is largely a consequence of the producing processor's waiting for the returned credits from the line buffer unit 502 to equal the size of the queue coupled with the RTS_2/ACK_2 propagation delay for the second packet. The long wait time can result in inefficiency of the processor in that traffic is not being sent over the network when it otherwise could have.

According to the prior design, the last data unit of a packet (e.g., D6) is specially marked or a sideband signal is sent to the line buffer unit 502 commensurate with the sending of a packet's last data unit so that the line buffer unit 502 knows when it has received the last data unit for a particular packet/connection. Here, when the last data unit (D6) of a packet/connection is serviced from the line buffer unit's queue, the line buffer unit 502 is permitted to acknowledge ACK_2 a next request RTS_2. Here, during the handling of the just completed first packet/connection (or even before then), requests from other producing processors for other producer/consumer kernel relationships that use the line buffer unit 502 may have been received by the line buffer unit 502. The line buffer unit 502 is free to acknowledge one of these requests (e.g., the oldest pending request), so as to begin a next packet transfer after it has serviced the last date unit (D6) from its just completed connection.

The sending processor 501 whose packet transfer was just completed is also free to send a next request RTS_2, as discussed above, as soon as its prior packet transfer is completed (at time 503 of FIG. 5a). If no other competing requests from other producing stencil processors are pending with the line buffer unit 502, the line buffer unit 502 will acknowledge the request RTS_2 that was sent by the sending processor 501 whose earlier packet transfer just completed. The process described above with respect to the first packet then repeats.

Figure 5B:
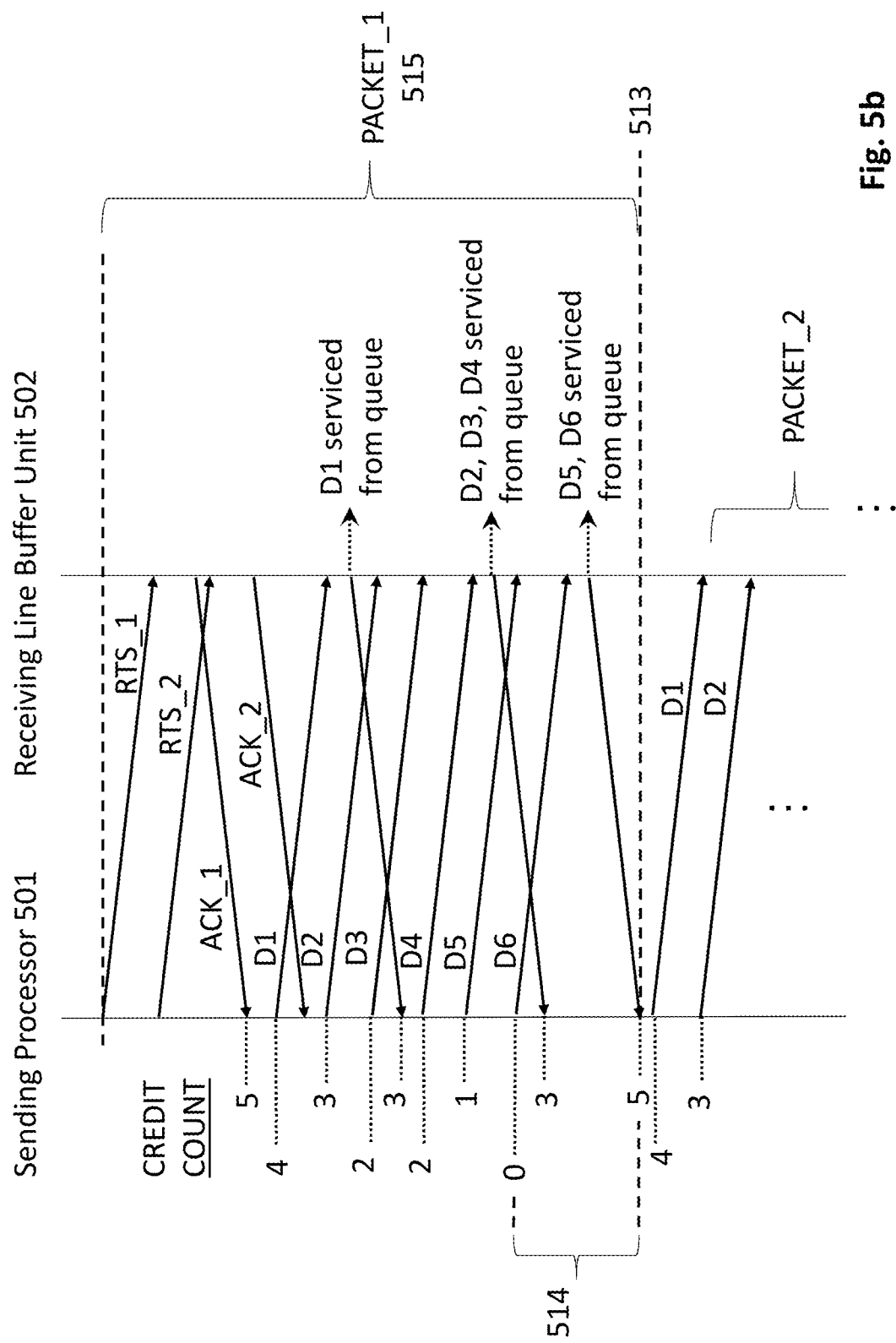
FIG. 5b shows an improved communication sequence.

FIG. 5b shows a first improvement to the prior design of FIG. 5a in which the sending processor 501 is permitted to send a request REQ_2 for a next packet prior to completion of a current packet being transmitted. That is, for example, time period 515 can be viewed as the time period over which the transmitted is engaged in transmission of the first packet (the communication session or connection of the first packet extends over time period 515). In the improved design of FIG. 5b, the sending processor is able to send a request REQ_2 for the second packet while the sending processor is engaged in the transmission of the first packet (that is, within time period 515).

In the particular example of FIG. 5b, the sending processor 501 is permitted to send a request as soon as it realizes it has another packet to send. As can be seen, the sending processor 501 recognizes it has another packet to send almost immediately after it sends the request RTS_1 for the first packet (RTS_2 is sent immediately after RTS_1).

Likewise, in the improved design, the line buffer unit 502 is free to respond to a request even though a packet transfer that it is currently handling has not yet completed. In a situation, e.g., where the line buffer unit 502 has no other competing requests from other sending processors (or REQ_2 was received by the line buffer unit 502 prior to such other competing requests), the line buffer unit 502 is free to acknowledge the second request ACK_2. Here, no credits are associated with the second acknowledgement ACK_2 because all credits are devoted to the packet transfer that is currently active (the first packet). Additionally, with the second acknowledgement ACK_2 being issued to the same sending processor 501 that is sending the current packet being transferred, both the sending processor 501 and the line buffer unit 502 understand that the current sending processor 501 will be sending the next packet to the line buffer unit 502 after the transfer of the current packet is complete.

Under these circumstances, with the sending processor 501 having already received the acknowledgement ACK_2 for the second packet to be transferred, the sending processor 501 can use the accumulated credits that signify the end of the first packet transfer for the transmission of the second, following packet. That is, recall from the discussion of FIG. 5a that the sending processor 501 recognizes completion of the first packet transfer after it has sent the last data unit D6 of the packet and its credit count corresponds to the size of the line buffer unit queue (N=5).

Accordingly, according to the prior design of FIG. 5a, such credits were unavailable for immediate use because the acknowledgement for the second packet ACK_2 had not yet been received. By contrast, with the improved approach of FIG. 5b, the sending processor 501 is able to immediately use these credits for the transfer of the second packet because it has already received the acknowledgement for the second packet ACK_2. The line buffer unit 502 will understand that the following data units to be received are for the second packet because it recognized the completion of the first packet with its reception of data unit D6 (described above with respect to FIG. 5a).

Also, the sending processor 501 of the prior design is not permitted to send a request to transfer a following packet to another line buffer unit until its current transfer with the present line buffer unit 502 is complete (producing kernels can sent output image data to more than one line buffer unit). As such, even if the second packet of FIG. 5a was to be sent to another line buffer unit, the wasted time 504 would still exist.

As discussed with respect to the improved design of FIG. 5b, the sending processor 501 is permitted to send a request for a second packet before the completion of its current packet. In various embodiments this includes sending a request to a different line buffer unit than the line buffer unit that the sending processor is currently engaged in a transaction with. Although not explicitly shown in FIG. 5b, assume that RTS_2 is sent to a line buffer unit other than line buffer unit 502 and that ACK_2 is received from the same, other line buffer unit 502. Here, with allocated credit amounts being provided on a line buffer unit by line buffer unit basis, when the other line buffer unit approves the request by sending the acknowledgment ACK_2, the sending processor 501 receives associated credits from the other line buffer unit while it is currently transferring the first packet to line buffer unit 501.

As such, in an embodiment, the sending processor's transceiver maintains multiple credit counters where different credit counters are used to keep track of credits from different line buffer units. In the case where the second packet is to be sent to a different destination than the first packet, the transmitter can concurrently send the first and second packets to their respective destinations in an interleaved fashion using a first of the credit counters for one of the destinations and using a second of the credit counters for another of the destinations (transmission of the second packet does not have to wait until completion of the first packet). In various embodiments, which credit counter corresponds to which destination can change depending on the traffic patterns being sent by the sending processor.

An example is shown in FIG. 5c. As observed in FIG. 5c, during a first time interval 521, the sending processor is sending a first packet to a first line buffer unit (LBU_1). Its credit count is kept in a first credit counter 531. Then, during a second time interval 522, the sending processor is still sending the first packet to the first line buffer unit but is also sending a second packet to a second line buffer unit (LBU_2). The credit count for the second packet is kept in a second, different credit counter 532 because it is being sent to a different line buffer unit than the line buffer unit whose transaction progresses in accordance with the first credit counter 531.

Then, during a third time interval 523, the first packet has completed its transmission but the second packet is still transmitting. Then, during a fourth time interval 524, the sending processor sends a third packet to a third line buffer (LBU_3) unit that is different than the first and second line buffer units. The credit count of the third packet is kept in the first credit counter 531. Then, during a fifth time interval 525 the second packet has completed its transfer and there is no following packet to send to the second line buffer unit or other line buffer unit.

Then, during a sixth time interval 526, the sending processor has another packet to send to the first line buffer unit. In this case the second credit counter 532 is used to keep the credits for this new packet to be sent to the first line buffer unit. Note that the credit counters for the first line buffer unit have essentially been swapped as between the pair of packets to be sent to the first line buffer unit. That is, during the first and second time intervals 521 and 522, the first credit counter 531 was used to keep track of credits for the first line buffer unit, whereas, during the sixth interval 526, the second credit counter 532 is used to keep track of credits for the first line buffer unit.

It is pertinent to point out that although the discussion above pertained to a processing core that is sending data to a line buffer unit, in the image processor described above, the same protocol scenario can exist for packet transfers from a line buffer unit to a processing core that executes a consuming kernel. In this case the line buffer unit assumes the behavior of the sender of FIGS. 5a through 5c and the processing core assumes the behavior of the receiver of FIGS. 5a and 5b. As such, in various embodiments, both processing cores (and/or their corresponding sheet generators) and line buffer units include both sender circuitry and receiver circuitry.

Figure 6A:
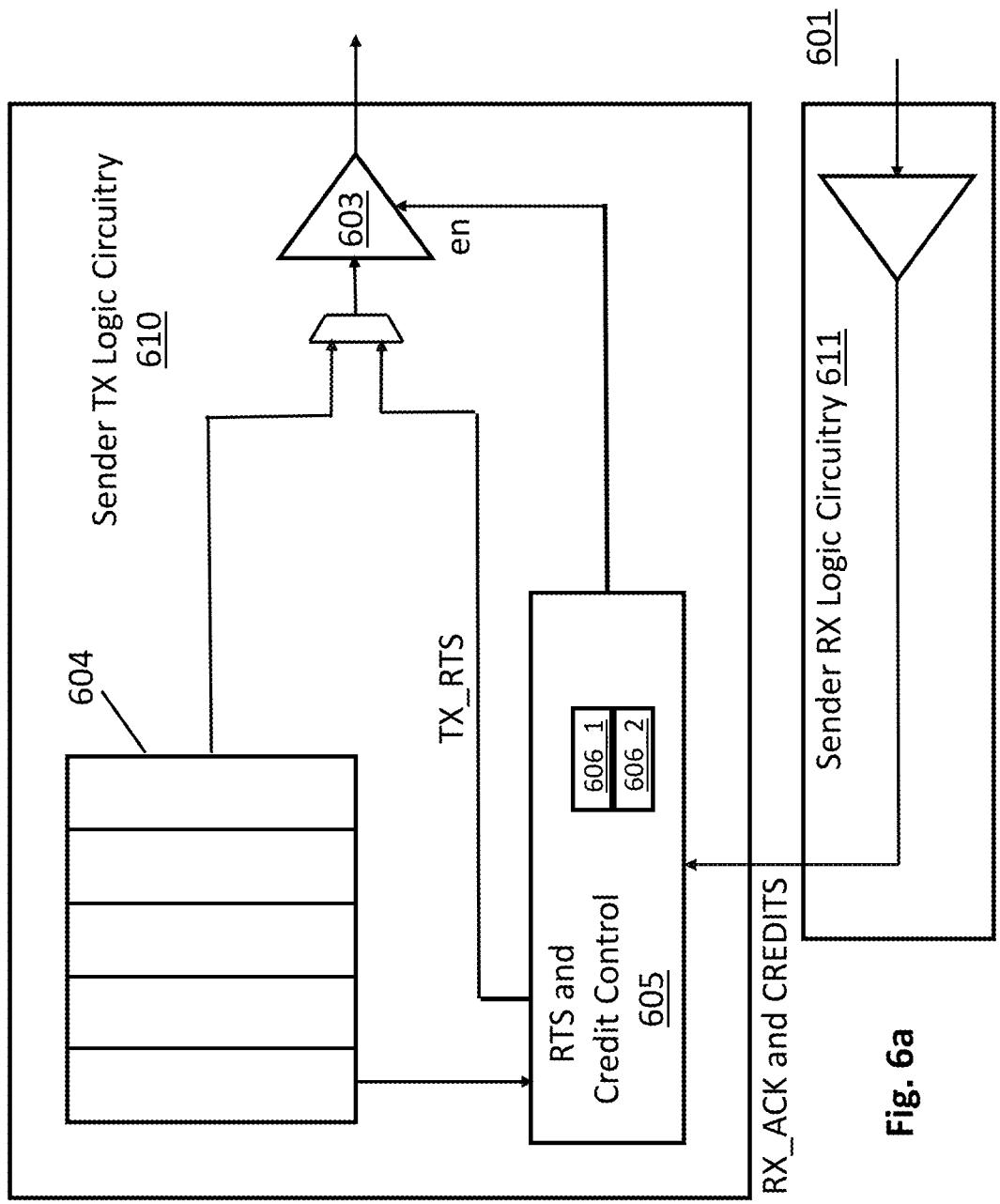
FIG. 6a shows an embodiment of a transmitter circuit.
Figure 6B:
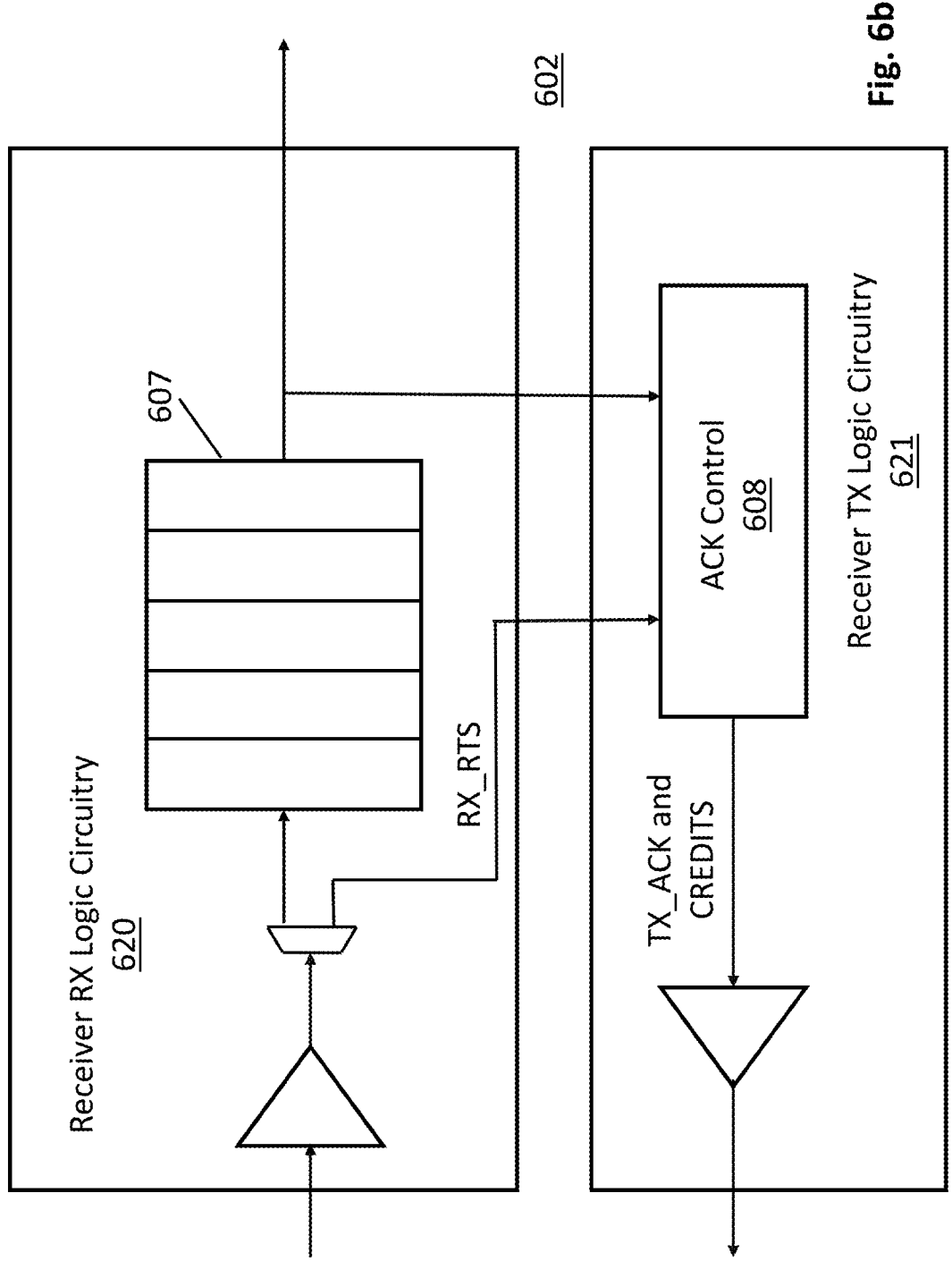
FIG. 6b shows an embodiment of a receiver circuit.

FIGS. 6a and 6b show embodiments of sender circuitry and receiver circuitry respectively. As observed in FIG. 6a, sender circuitry 601 includes a transmitter that sends data units or RTS requests in accordance with the protocols described above. Data units that are ready to be sent are queued in output queue 604. RTS and credit control logic circuitry 605 authorizes the sending of a next data unit to its destination in accordance with a credit count that is maintained for a current session with the destination in one of credit counters 606_1, 606_2. Control logic 605 also issues RTS requests to initiate transfer sessions with appropriate destinations. The identity of a destination to which to send a next RTS may be determined, e.g., from a destination address associated with an outbound packet in outbound queue 604.

Reception circuitry 611 receives acknowledgements and credit amounts and forwards them to control logic 605. Note that two credit counters 606_1 and 606_2 are observed in the control logic of 605. The credit counts 606_1, 606_2 in various embodiments are assigned to hold the credits for a particular destination on, e.g., a per communication session basis such that they may swap which destination they hold credits for depending on outbound traffic flow as described above with respect to FIG. 5c.

In other embodiments more than two credit counters may be present so that the sending circuitry 602 can concurrently entertain more than two transfer sessions with more than two different destinations. That is, how many concurrent transactions with different destinations may vary from embodiment to embodiment depending upon, e.g., the capability/capacity of the network. In an embodiment, sender circuit 601 is permitted to send an RTS for a second packet while a first, earlier packet is being transmitted. The destination to which the RTS for the second packet is sent may be the destination that the first, earlier packet is being sent to or some other destination.

FIG. 6b shows receiver side circuitry 602. Here, received data units that are received by the receiver circuitry 620 are queued in inbound queue 607 (recall that in various embodiments, the number of outstanding credits corresponds to the size of the inbound queue 607). When a received data unit is serviced from the queue 607, control logic 608 sends a corresponding credit amount back to the sender of the data unit via transmission circuitry 621. Control logic 608 also determines which of potentially multiple senders that have directed RTS requests to the receiver 602 are to be chosen as the next sender from whom the receiver 602 will receive a packet from. The multiple pending RTS requests may reside in a queue within the control logic 608 (not shown in FIG. 6b) and the logic selects one of the RTS requests from the queue according to some (e.g., fairness) algorithm (e.g., round robin across the different senders that the receiver 602 is configured to receive from, oldest RTS in the queue, etc.). When the control logic 608 determines which sender amongst the multiple requesting senders is to be allowed to send the receiver a packet, control logic 608 causes an acknowledgement to be sent to the sender via transmission circuitry 621.

In various embodiments, no credits are sent for acknowledgement that is send to a same sender that the receiver is currently receiving a packet from. Additionally, in various embodiments, a credit amount that corresponds to the size of the queue 607 is sent along with an acknowledgement that is sent to a sender that the receiver 602 is not currently receiving a packet from. In various embodiments the receiver 602 does not interleave multiple packets from a same sender or different senders (only one packet from one sender is permitted to be received by the receiver 602).

Control logic circuits 605, 608 may be implemented as dedicated hardware logic circuits, programmable logic circuits (e.g., field programmable gate array (FPGA) logic circuits, programmable logic device (PLD) logic circuits, programmable logic array (PLA) logic circuits), embedded processor circuits that execute program code in order to perform control logic functions or any combination of these approaches.

Figure 7:
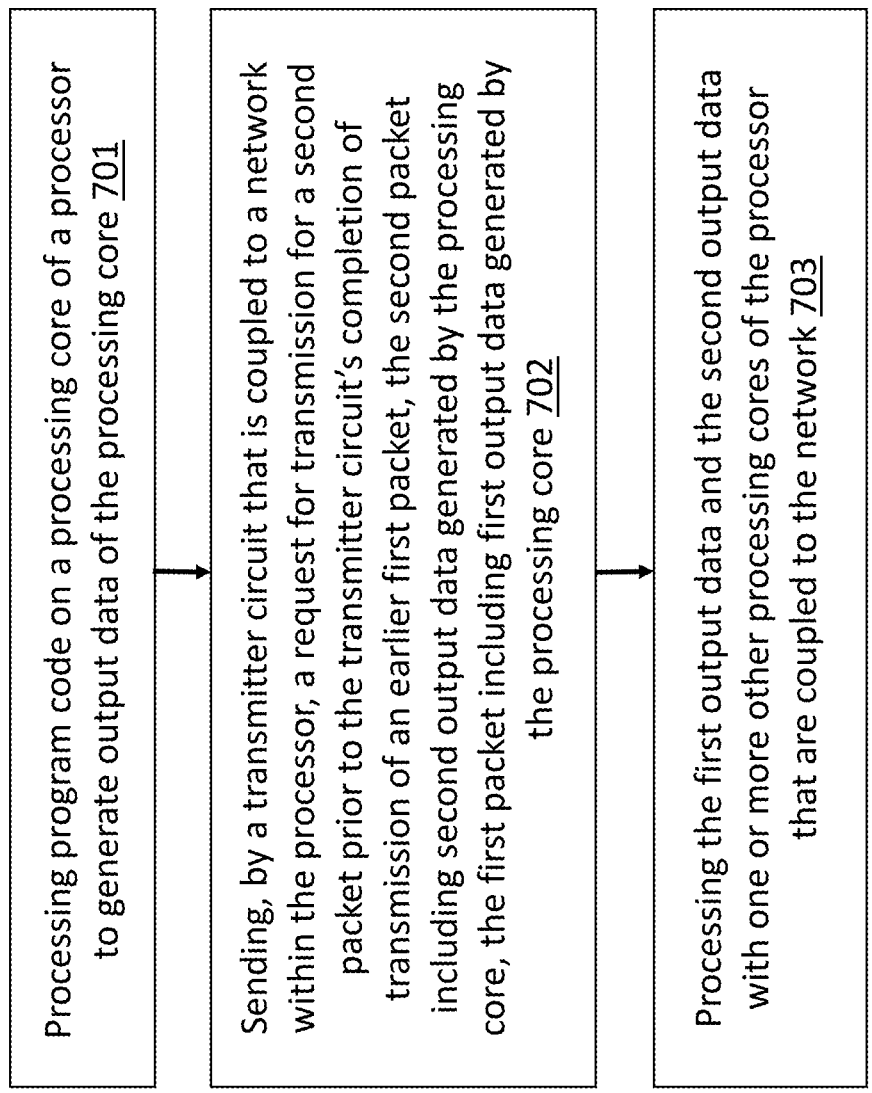
FIG. 7 shows a communication method.

FIG. 7 depicts a method that has been described above. The method includes processing program code on a processing core of the processor to generate output data of the processing core 701. The method includes sending 702, by a transmitter circuit that is coupled to a network within the processor, a request for transmission for a second packet prior to the transmitter circuit's completion of transmission of an earlier first packet. The second packet includes second output data generated by the processing core and the first packet includes first output data generated by the processing core. The method also includes processing the first output data and the second output data with one or more other processing cores of the processor that are coupled to the network 703.

3.0 Image Processor Implementation Embodiments

FIGS. 8a-e through FIG. 12 provide additional details concerning operation and design of various embodiments for the image processor and associated stencil processor described at length above. Recalling from the discussion of FIG. 2 that a line buffer unit feeds line groups to a stencil processor's associated sheet generator, FIGS. 8a through 8e illustrate at a high level embodiments of both the parsing activity of a line buffer unit 201, the finer grained parsing activity of a sheet generator unit 203 as well as the stencil processing activity of the stencil processor 702 that is coupled to the sheet generator unit 203.

FIG. 8a depicts an embodiment of an input frame of image data 801. FIG. 8a also depicts an outline of three overlapping stencils 802 (each having a dimension of 3 pixels×3 pixels) that a stencil processor is designed to operate over. The output pixel that each stencil respectively generates output image data for is highlighted in solid black. For simplicity, the three overlapping stencils 802 are depicted as overlapping only in the vertical direction. It is pertinent to recognize that in actuality a stencil processor may be designed to have overlapping stencils in both the vertical and horizontal directions.

Because of the vertical overlapping stencils 802 within the stencil processor, as observed in FIG. 8a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 201 is responsible for parsing a line group of input image data from an incoming frame that is sufficient for the stencil processors to operate over for an extended number of upcoming cycles. An exemplary depiction of a line group is illustrated as a shaded region 803. In an embodiment, the line buffer unit 201 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 803 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Figure 8B:
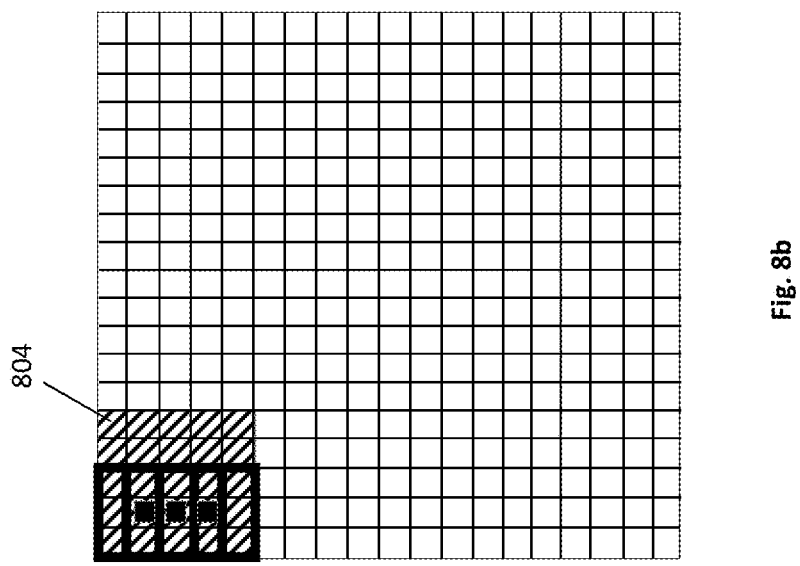
Figure 8C:
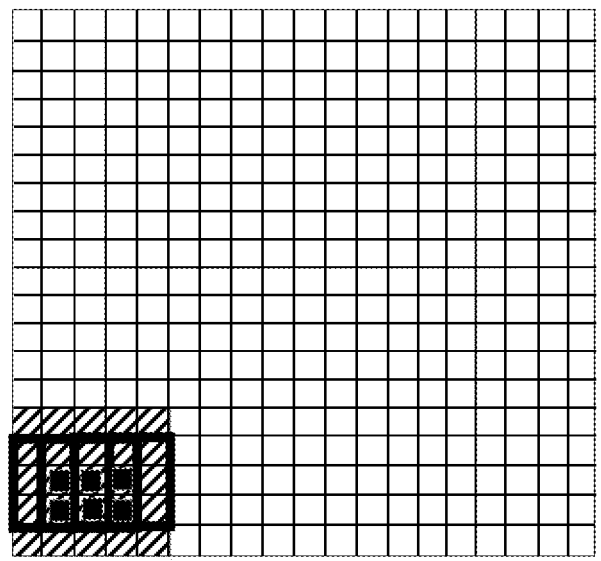
Figure 8D:
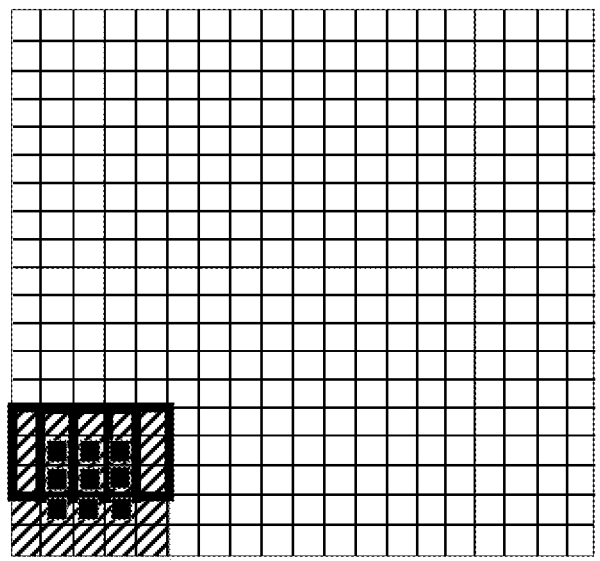

Thus, as observed in FIG. 8b, the sheet generator parses an initial sheet 804 from the line group 803 and provides it to the stencil processor (here, the sheet of data corresponds to the shaded region that is generally identified by reference number 804). As observed in FIGS. 8c and 8d, the stencil processor operates on the sheet of input image data by effectively moving the overlapping stencils 802 in a left to right fashion over the sheet. As of FIG. 8d, the number of pixels for which an output value could be calculated from the data within the sheet is exhausted (no other pixel positions can have an output value determined from the information within the sheet). For simplicity the border regions of the image have been ignored.

As observed in FIG. 8e the sheet generator then provides a next sheet 805 for the stencil processor to continue operations on. Note that the initial positions of the stencils as they begin operation on the next sheet is the next progression to the right from the point of exhaustion on the first sheet (as depicted previously in FIG. 8d). With the new sheet 805, the stencils will simply continue moving to the right as the stencil processor operates on the new sheet in the same manner as with the processing of the first sheet.

Note that there is some overlap between the data of the first sheet 804 and the data of the second sheet 805 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

Figure 9A:
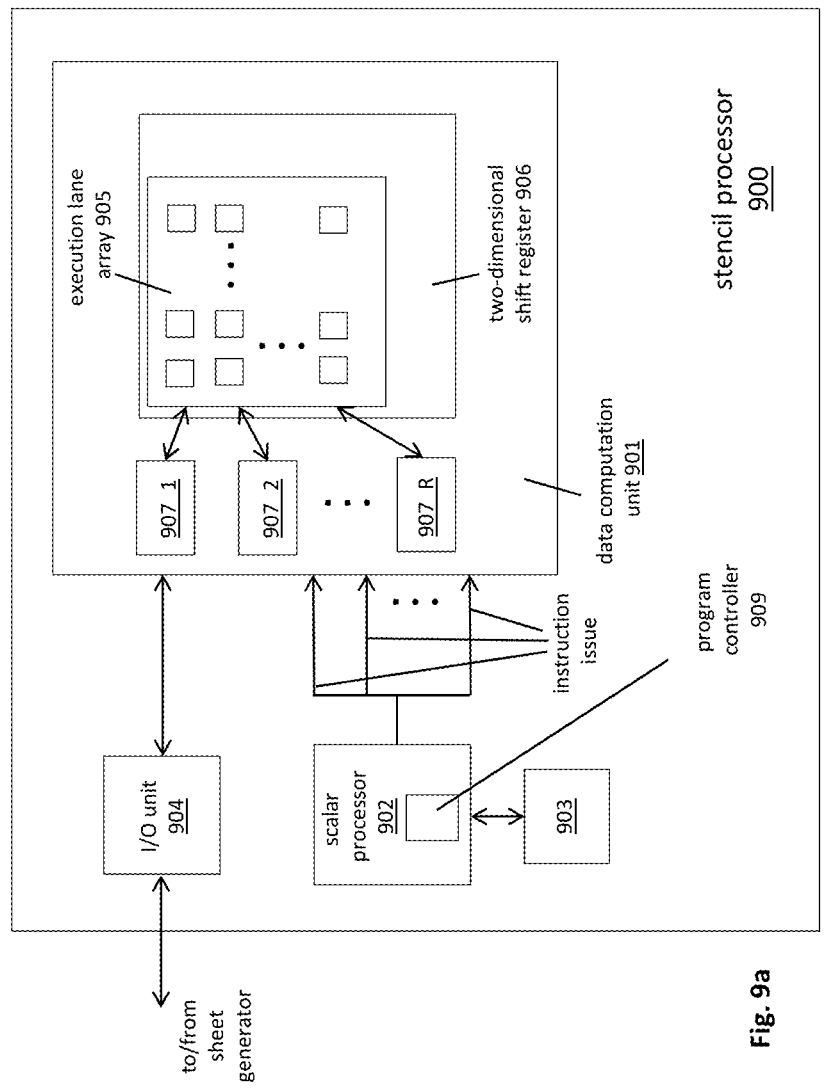
FIG. 9a shows an embodiment of a stencil processor.

FIG. 9 shows an embodiment of a stencil processor architecture 900. As observed in FIG. 9, the stencil processor includes a data computation unit 901, a scalar processor 902 and associated memory 903 and an I/O unit 904. The data computation unit 901 includes an array of execution lanes 905, a two-dimensional shift array structure 906 and separate random access memories 907 associated with specific rows or columns of the array.

The I/O unit 904 is responsible for loading "input" sheets of data received from the sheet generator into the data computation unit 901 and storing "output" sheets of data from the stencil processor into the sheet generator. In an embodiment the loading of sheet data into the data computation unit 901 entails parsing a received sheet into rows/columns of image data and loading the rows/columns of image data into the two dimensional shift register structure 906 or respective random access memories 907 of the rows/columns of the execution lane array (described in more detail below). If the sheet is initially loaded into memories 907, the individual execution lanes within the execution lane array 905 may then load sheet data into the two-dimensional shift register structure 906 from the random access memories 907 when appropriate (e.g., as a load instruction just prior to operation on the sheet's data). Upon completion of the loading of a sheet of data into the register structure 906 (whether directly from a sheet generator or from memories 907), the execution lanes of the execution lane array 905 operate on the data and eventually "write back" finished data as a sheet directly back to the sheet generator, or, into the random access memories 907. If the later the I/O unit 904 fetches the data from the random access memories 907 to form an output sheet which is then forwarded to the sheet generator.

The scalar processor 902 includes a program controller 909 that reads the instructions of the stencil processor's program code from scalar memory 903 and issues the instructions to the execution lanes in the execution lane array 905. In an embodiment, a single same instruction is broadcast to all execution lanes within the array 905 to effect a SIMD-like behavior from the data computation unit 901. In an embodiment, the instruction format of the instructions read from scalar memory 903 and issued to the execution lanes of the execution lane array 905 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 905).

The combination of an execution lane array 905, program controller 909 and two dimensional shift register structure 906 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 905, the random access memories 907 may also keep one or more look-up tables. In various embodiments one or more scalar look-up tables may also be instantiated within the scalar memory 903.

A scalar look-up involves passing the same data value from the same look-up table from the same index to each of the execution lanes within the execution lane array 905. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 905 during the same clock cycle. Additional details concerning use and operation of look-up tables is provided further below.

Figure 9B:
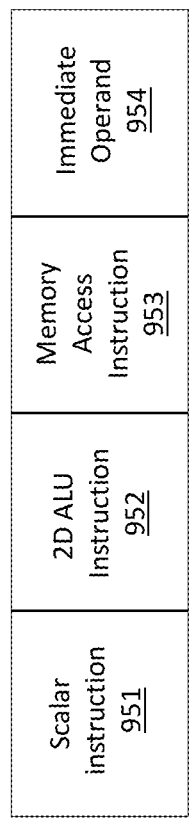
FIG. 9b shows an embodiment of an instruction word of the stencil processor.

FIG. 9b summarizes the VLIW instruction word embodiments(s) discussed above. As observed in FIG. 9b, the VLIW instruction word format includes fields for three separate instructions: 1) a scalar instruction 951 that is executed by the scalar processor; 2) an ALU instruction 952 that is broadcasted and executed in SIMD fashion by the respective ALUs within the execution lane array; and, 3) a memory instruction 953 that is broadcasted and executed in a partial SIMD fashion (e.g., if execution lanes along a same row in the execution lane array share a same random access memory, then one execution lane from each of the different rows actually execute the instruction (the format of the memory instruction 953 may include an operand that identifies which execution lane from each row executes the instruction).

A field 954 for one or more immediate operands is also included. Which of the instructions 951, 952, 953 use which immediate operand information may be identified in the instruction format. Each of instructions 951, 952, 953 also include their own respective input operand and resultant information (e.g., local registers for ALU operations and a local register and a memory address for memory access instructions). In an embodiment, the scalar instruction 951 is executed by the scalar processor before the execution lanes within the execution lane array execute either of the other to instructions 952, 953. That is, the execution of the VLIW word includes a first cycle upon which the scalar instruction 951 is executed followed by a second cycle upon with the other instructions 952, 953 may be executed (note that in various embodiments instructions 952 and 953 may be executed in parallel).

In an embodiment, the scalar instructions executed by the scalar processor include commands issued to the sheet generator to load/store sheets from/into the memories or 2D shift register of the data computation unit. Here, the sheet generator's operation can be dependent on the operation of the line buffer unit or other variables that prevent pre-runtime comprehension of the number of cycles it will take the sheet generator to complete any command issued by the scalar processor. As such, in an embodiment, any VLIW word whose scalar instruction 951 corresponds to or otherwise causes a command to be issued to the sheet generator also includes no-operation (NOOP) instructions in the other two instruction field 952, 953. The program code then enters a loop of NOOP instructions for instruction fields 952, 953 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 10:
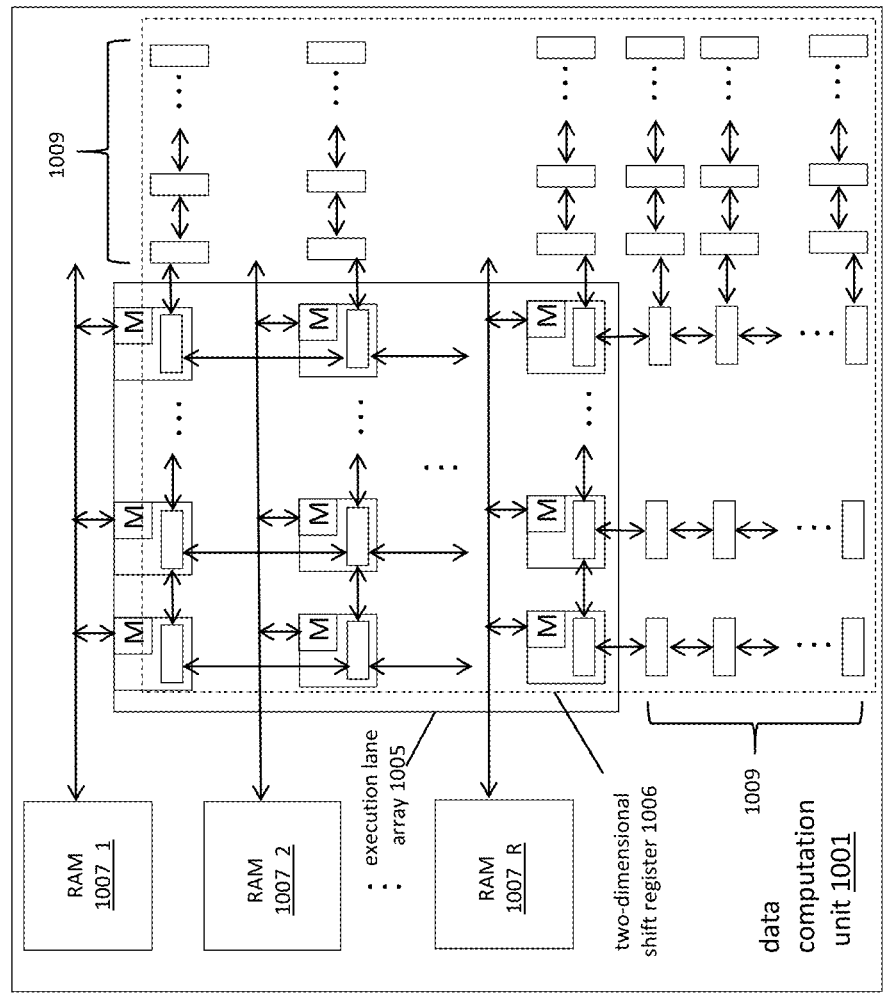
FIG. 10 shows an embodiment of a data computation unit within a stencil processor.

FIG. 10 shows an embodiment of a data computation component 1001. As observed in FIG. 10, the data computation component 1001 includes an array of execution lanes 1005 that are logically positioned "above" a two-dimensional shift register array structure 1006. As discussed above, in various embodiments, a sheet of image data provided by a sheet generator is loaded into the two-dimensional shift register 1006. The execution lanes then operate on the sheet data from the register structure 1006.

The execution lane array 1005 and shift register structure 1006 are fixed in position relative to one another. However, the data within the shift register array 1006 shifts in a strategic and coordinated fashion to cause each execution lane in the execution lane array to process a different stencil within the data. As such, each execution lane determines the output image value for a different pixel in the output sheet being generated. From the architecture of FIG. 10 it should be clear that overlapping stencils are not only arranged vertically but also horizontally as the execution lane array 1005 includes vertically adjacent execution lanes as well as horizontally adjacent execution lanes.

Some notable architectural features of the data computation unit 1001 include the shift register structure 1006 having wider dimensions than the execution lane array 1005. That is, there is a "halo" of registers 1009 outside the execution lane array 1005. Although the halo 1009 is shown to exist on two sides of the execution lane array, depending on implementation, the halo may exist on less (one) or more (three or four) sides of the execution lane array 1005. The halo 1005 serves to provide "spill-over" space for data that spills outside the bounds of the execution lane array 1005 as the data is shifting "beneath" the execution lanes 1005. As a simple case, a 5×5 stencil centered on the right edge of the execution lane array 1005 will need four halo register locations further to the right when the stencil's leftmost pixels are processed. For ease of drawing, FIG. 10 shows the registers of the right side of the halo as only having horizontal shift connections and registers of the bottom side of the halo as only having vertical shift connections when, in a nominal embodiment, registers on either side (right, bottom) would have both horizontal and vertical connections. In various embodiments, the halo region does not include corresponding execution lane logic to execute image processing instructions (e.g., no ALU is present). However, individual memory access units (M) are present in each of the halo region locations so that the individual halo register locations can individually load data from memory and store data to memory.

Additional spill-over room is provided by random access memories 1007 that are coupled to each row and/or each column in the array, or portions thereof (E.g., a random access memory may be assigned to a "region" of the execution lane array that spans 4 execution lanes row wise and 2 execution lanes column wise. For simplicity the remainder of the application will refer mainly to row and/or column based allocation schemes). Here, if a execution lane's kernel operations require it to process pixel values outside of the two-dimensional shift register array 1006 (which some image processing routines may require) the plane of image data is able to further spill-over, e.g., from the halo region 1009 into random access memory 1007. For example, consider a 6×6 stencil where the hardware includes a halo region of only four storage elements to the right of a execution lane on the right edge of the execution lane array. In this case, the data would need to be shifted further to the right off the right edge of the halo 1009 to fully process the stencil. Data that is shifted outside the halo region 1009 would then spill-over to random access memory 1007. Other applications of the random access memories 1007 and the stencil processor of FIG. 9 are provided further below.

FIGS. 11a through 11k demonstrate a working example of the manner in which image data is shifted within the two dimensional shift register array "beneath" the execution lane array as alluded to above. As observed in FIG. 11a, the data contents of the two dimensional shift array are depicted in a first array 1107 and the execution lane array is depicted by a frame 1105. Also, two neighboring execution lanes 1110 within the execution lane array are simplistically depicted. In this simplistic depiction 1110, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 11a through 11k depict one of these deeper register locations as being used to store the resultant X from the respective execution lanes. For illustrative ease the deeper resultant register is drawn alongside rather than beneath its counterpart register R2.

FIGS. 11a through 11k focus on the calculation of two stencils whose central position is aligned with the pair of execution lane positions 1111 depicted within the execution lane array. For ease of illustration, the pair of execution lanes 1110 are drawn as horizontal neighbors when in fact, according to the following example, they are vertical neighbors.

Figure 11A:
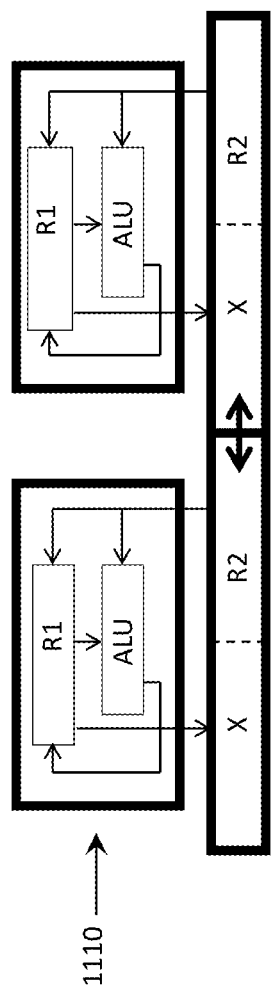
FIGS. 11a, 11b, 11c, 11d, 11e, 11f, 11g, 11h, 11i, 11j and 11k depict an example of the use of a two-dimensional shift array and an execution lane array to determine a pair of neighboring output pixel values with overlapping stencils.
Figure 11A:
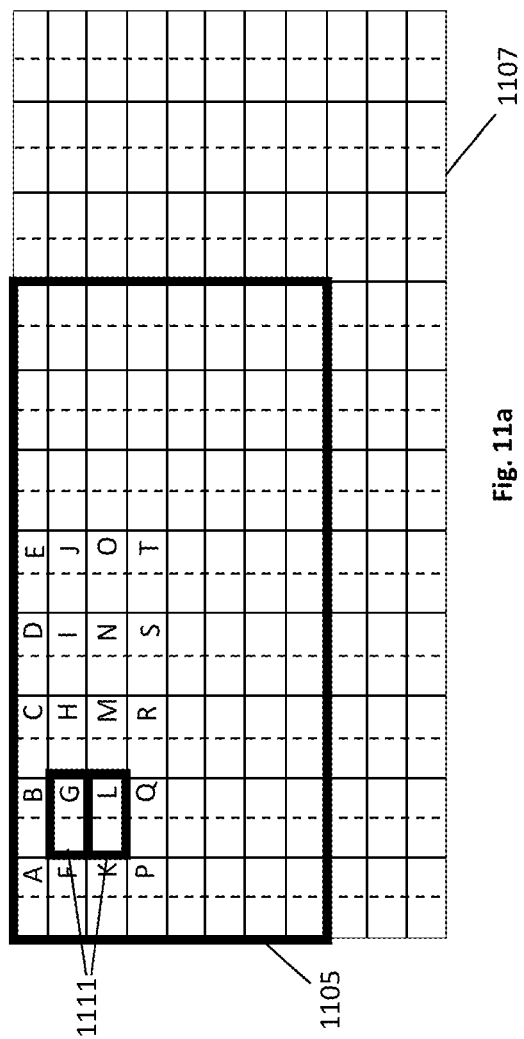
Figure 11B:
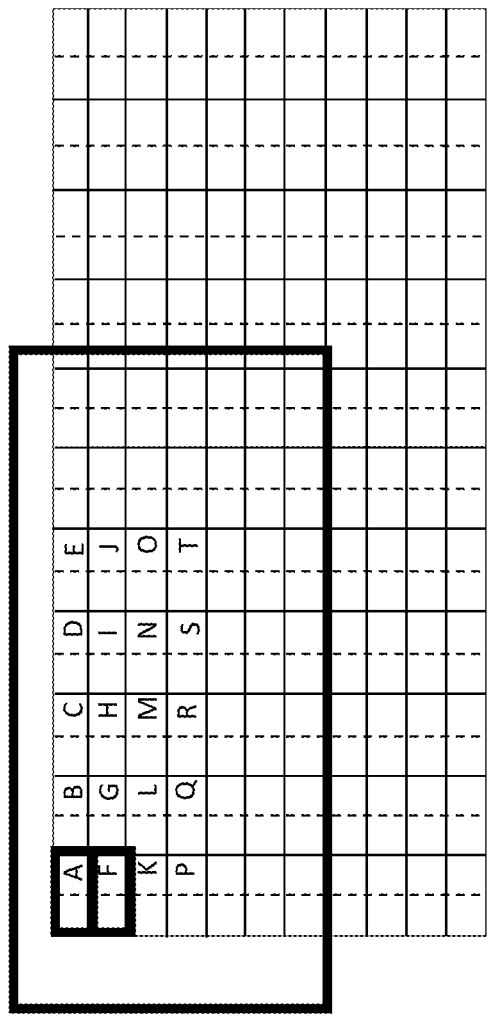

As observed initially in FIG. 11a, the execution lanes are centered on their central stencil locations. FIG. 11b shows the object code executed by both execution lanes. As observed in FIG. 11b the program code of both execution lanes causes the data within the shift register array to shift down one position and shift right one position. This aligns both execution lanes to the upper left hand corner of their respective stencils. The program code then causes the data that is located (in R2) in their respective locations to be loaded into R1.

Figure 11C:
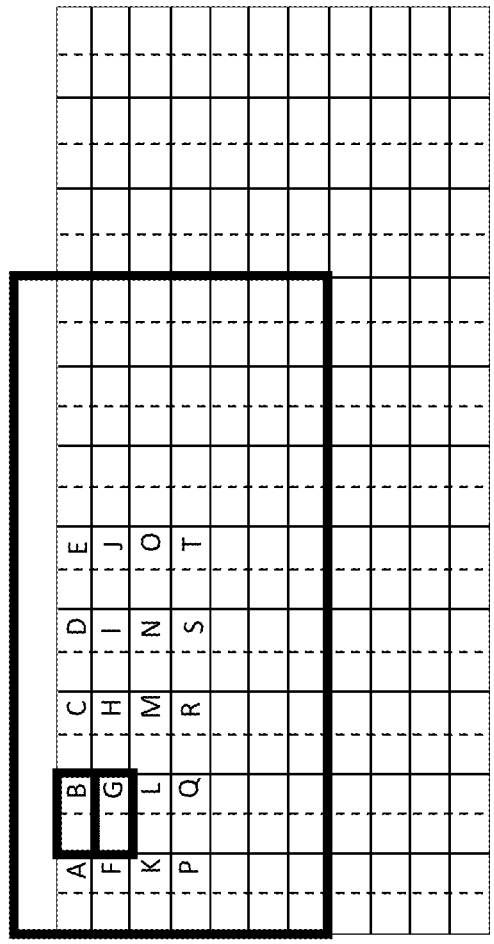
Figure 11D:
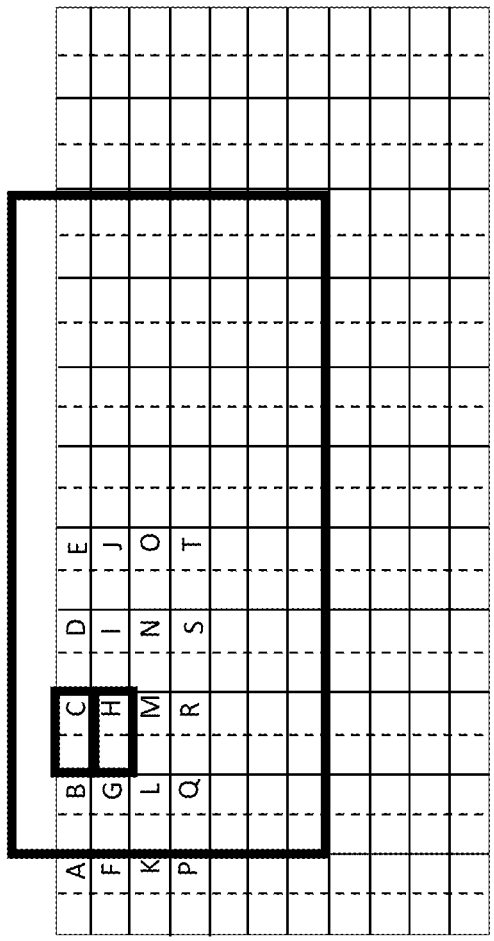

As observed in FIG. 11c the program code next causes the pair of execution lanes to shift the data within the shift register array one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 11d the same process as described above for FIG. 11c is repeated which causes the resultant R1 to now include the value A+B+C in the upper execution lane and F+G+H in the lower execution lane. At this point both execution lanes have processed the upper row of their respective stencils. Note the spill-over into a halo region on the left side of the execution lane array (if one exists on the left hand side) or into random access memory if a halo region does not exist on the left hand side of the execution lane array.

Figure 11E:
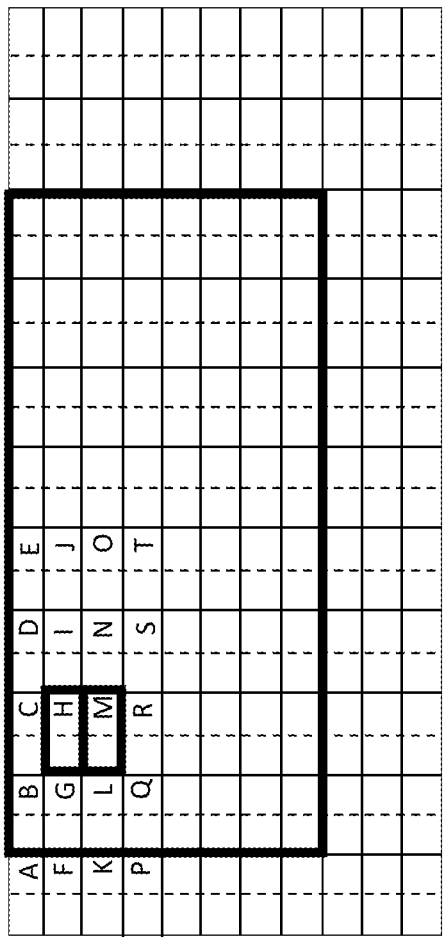
Figure 11F:
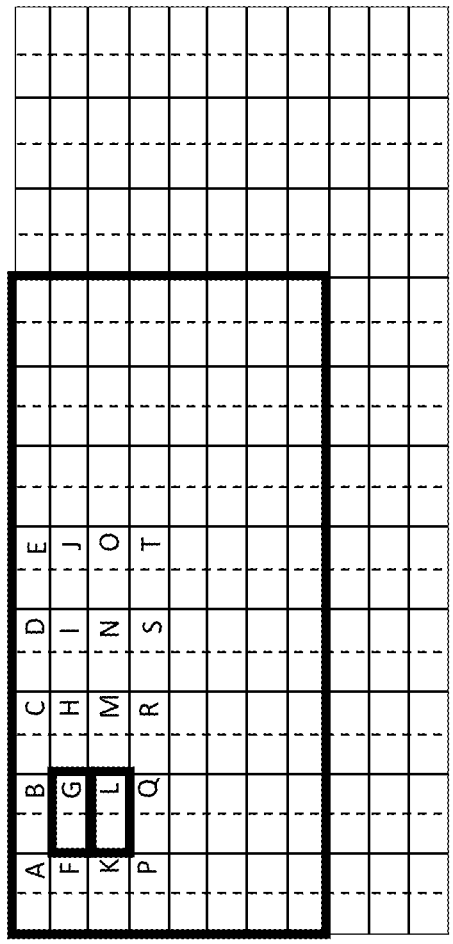
Figure 11G:
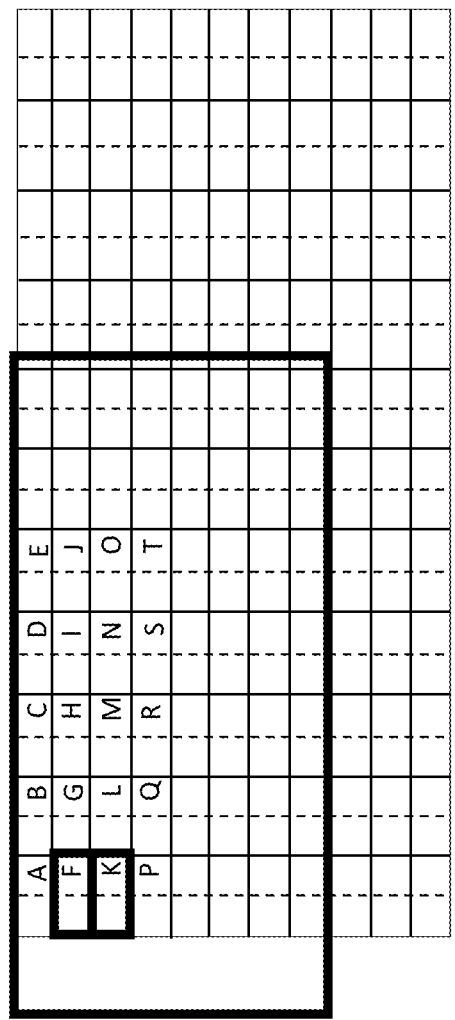

As observed in FIG. 11e, the program code next causes the data within the shift register array to shift one unit up which causes both execution lanes to be aligned with the right edge of the middle row of their respective stencils. Register R1 of both execution lanes currently includes the summation of the stencil's top row and the middle row's rightmost value. FIGS. 11f and 11g demonstrate continued progress moving leftwise across the middle row of both execution lane's stencils. The accumulative addition continues such that at the end of processing of FIG. 11g both execution lanes include the summation of the values of the top row and the middle row of their respective stencils.

Figure 11H:
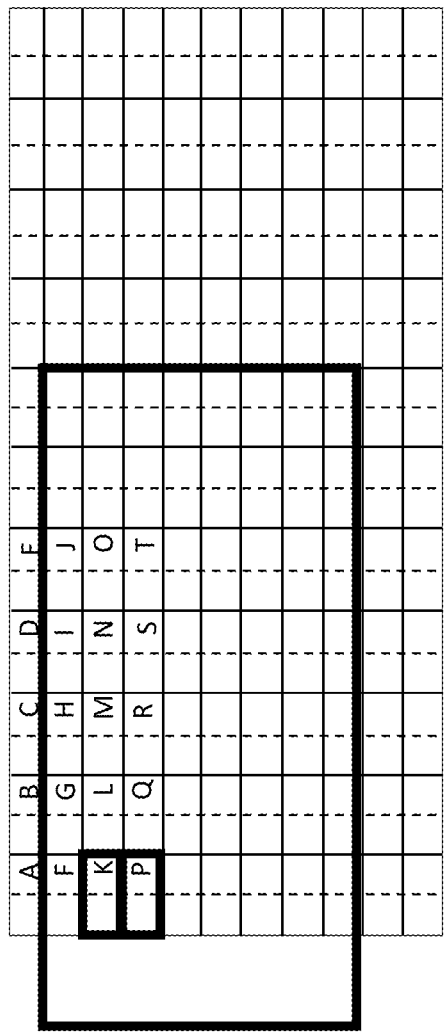
Figure 11I:
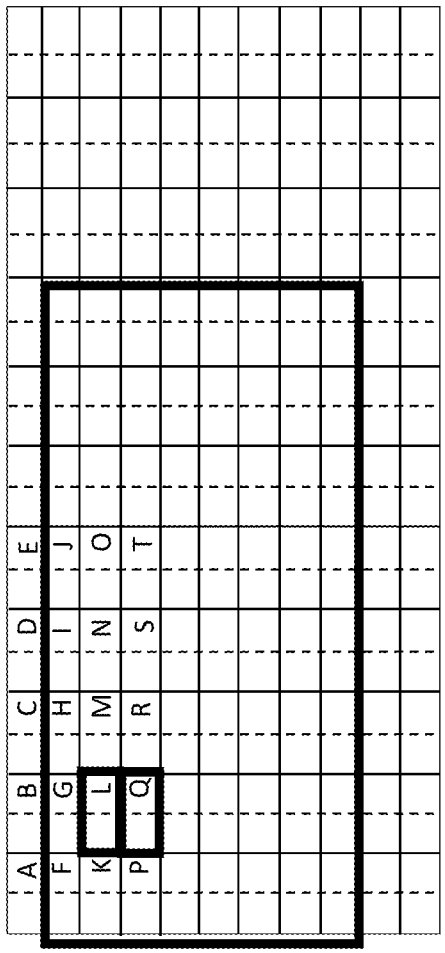
Figure 11J:
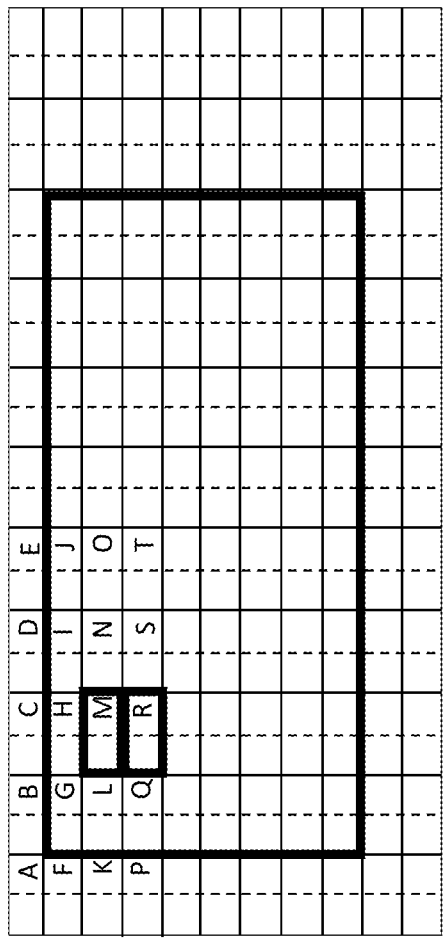
Figure 11K:
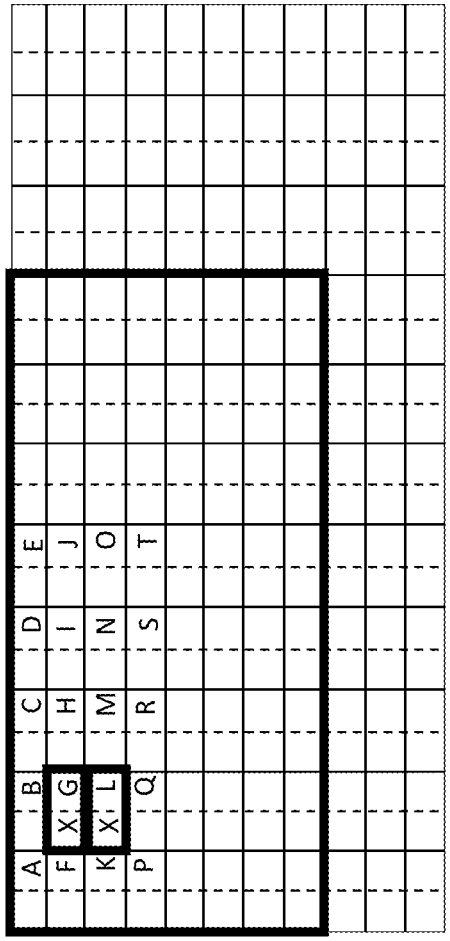

FIG. 11h shows another shift to align each execution lane with its corresponding stencil's lowest row. FIGS. 11i and 11j show continued shifting to complete processing over the course of both execution lanes' stencils. FIG. 11k shows additional shifting to align each execution lane with its correct position in the data array and write the resultant thereto.

In the example of FIGS. 11a-11k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

FIG. 12 shows another, more detailed depiction of the unit cell for an execution lane and corresponding shift register structure (registers in the halo region do not include a corresponding execution lane but do include a memory unit in various embodiments). The execution lane and the register space associated with each location in the execution lane array is, in an embodiment, implemented by instantiating the circuitry observed in FIG. 12 at each node of the execution lane array. As observed in FIG. 12, the unit cell includes a execution lane 1201 coupled to a register file 1202 consisting of four registers R2 through R5. During any cycle, the execution lane 1201 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 1203, and, having the contents of any of (only) one of registers R2 through R4 replaced with content that is shifted "in" from a corresponding one if its neighbors through input multiplexers 1204 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 1203, 1204 permits for different shift source and shift target registers within a same register file during a same cycle.

As depicted in FIG. 12 note that during a shift sequence a execution lane will shift content out from its register file 1202 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 1203, 1204 observed in FIG. 12 is incorporated into the design of FIG. 12. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of a execution lane's register files are shifted out during a shift sequence note that the content of the non shifted out registers of each execution lane remain in place (do not shift). As such, any non shifted content that is not replaced with shifted in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 1201, in various embodiments, the mathematical opcodes supported by the hardware ALU include (e.g., ADD, SUB, MOV, MUL, MAD, ABS, DIV, SHL, SHR, MIN/MAX, SEL, AND, OR, XOR, NOT). As described just above, memory access instructions can be executed by the execution lane 1201 to fetch/store data from/to their associated random access memory. Additionally the hardware execution lane 1201 supports shift op instructions (right, left, up, down) to shift data within the two dimensional shift register structure. As described above, program control instructions are largely executed by the scalar processor of the stencil processor.

4.0 Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 13 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two. Additionally, the computing system of FIG. 13 also includes many features of a high performance computing system, such as a workstation or supercomputer.

As observed in FIG. 13, the basic computing system may include a central processing unit 1301 (which may include, e.g., a plurality of general purpose processing cores 1315_1 through 1315_N and a main memory controller 1317 disposed on a multi-core processor or applications processor), system memory 1302, a display 1303 (e.g., touchscreen, flat-panel), a local wired point-to-point link (e.g., USB) interface 1304, various network I/O functions 1305 (such as an Ethernet interface and/or cellular modem subsystem), a wireless local area network (e.g., WiFi) interface 1306, a wireless point-to-point link (e.g., Bluetooth) interface 1307 and a Global Positioning System interface 1308, various sensors 1309_1 through 1309_N, one or more cameras 1310, a battery 1311, a power management control unit 1312, a speaker and microphone 1313 and an audio coder/decoder 1314.

An applications processor or multi-core processor 1350 may include one or more general purpose processing cores 1315 within its CPU 1201, one or more graphical processing units 1316, a memory management function 1317 (e.g., a memory controller), an I/O control function 1318 and an image processing unit 1319. The general purpose processing cores 1315 typically execute the operating system and application software of the computing system. The graphics processing units 1316 typically execute graphics intensive functions to, e.g., generate graphics information that is presented on the display 1303. The memory control function 1317 interfaces with the system memory 1302 to write/read data to/from system memory 1302. The power management control unit 1312 generally controls the power consumption of the system 1300.

The image processing unit 1319 may be implemented according to any of the image processing unit embodiments described at length above in the preceding sections. Alternatively or in combination, the IPU 1319 may be coupled to either or both of the GPU 1316 and CPU 1301 as a co-processor thereof. Additionally, in various embodiments, the GPU 1316 may be implemented with any of the image processor features described at length above. The image processing unit 1319, or other unit of the computing system that sends data, may be configured with a transceiver that implements an efficient communication sequence as described at length above.

Each of the touchscreen display 1303, the communication interfaces 1304-1307, the GPS interface 1308, the sensors 1309, the camera 1310, and the speaker/microphone codec 1313, 1314 all can be viewed as various forms of I/O (input and/or output) relative to the overall computing system including, where appropriate, an integrated peripheral device as well (e.g., the one or more cameras 1310). Depending on implementation, various ones of these I/O components may be integrated on the applications processor/multi-core processor 1350 or may be located off the die or outside the package of the applications processor/multi-core processor 1350.

In an embodiment one or more cameras 1310 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired and/or programmable logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A processor, comprising:
a network implementing a credit counter protocol that requires each sender to receive an acknowledgement from a receiver for a data packet to be transmitted before the sender sends data units belonging to the data packet;
one or more processing cores coupled to the network; and
a transmitter circuit coupling a first processing core of the one or more processing cores to the network, the transmitter circuit being configured to transmit data units output by the first processing core into the network, the transmitter circuit comprising control logic circuitry that is configured to cause the transmitter circuit to:
initiate transmitting a first data packet to a first receiver of the processor,
provide a request for a different second data packet to be transmitted to a different second receiver of the processor before a last data unit of the first data packet has been transmitted to the first receiver,
receive a pre-issued acknowledgement for the different second data packet to be transmitted before the last data unit of the first data packet has been transmitted to the first receiver,
increment a different second receiver-specific credit counter for the second receiver in response to receiving the pre-issued acknowledgement for the different second data packet to be transmitted,
receive an indication that the last data unit of the first data packet has been consumed by the first receiver,
increment a first receiver-specific credit counter in response to receiving the indication that the last data unit belonging to the first data packet has been consumed by the first receiver, and
send a first data unit belonging to the different second data packet to the different second receiver using credits of the second receiver-specific credit counter incremented due to receiving the pre-issued acknowledgement for the different second data packet to be transmitted.

2. The processor of claim 1, wherein the control logic circuitry comprises a plurality of credit counters, and wherein the control logic circuitry is configured to reassign each credit counter to a different respective receiver after a respective data packet is transmitted.

3. The processor of claim 1, wherein the second receiver of the second data packet is a different component of the processor than the first receiver of the first data packet.

4. The processor of claim 1, wherein the processor further comprises a line buffer, and wherein the first receiver of the first data packet is the line buffer.

5. The processor of claim 1, wherein receiving the pre-issued transaction acknowledgement for the second data packet comprises receiving the pre-issued acknowledgement for the second data packet before sending any data units of the first data packet.

6. The processor of claim 1, wherein the control logic circuitry is configured to increment the credits of the second receiver-specific credit counter due to receiving the pre-issued acknowledgment whenever the first receiver of the processor is a different component than the second receiver of the processor.

7. The processor of claim 1, wherein the control logic circuitry is configured to send interleaved data units to the first receiver of the processor and the second receiver of the processor using the first receiver-specific credit counter for data units belonging to the first data packet and the second receiver-specific credit counter for data units belonging to the second data packet respectively.

8. A method performed by a processor having one or more processing cores and a network implementing a credit counter protocol that requires each sender to receive an acknowledgement from a receiver for a data packet to be transmitted before the sender sends data units belonging to the data packet, the method comprising:
processing, by a first processing core of the one or more processing cores, program code to generate output data to be sent in a first data packet and a different second data packet;
initiating, by a transmitter circuit coupling the first processing core to the network, transmitting the first data packet to a first receiver of the processor;
providing, by the transmitter circuit, a request for the different second data packet to be transmitted to a different second receiver of the processor before a last data unit of the first data packet has been transmitted to the first receiver;
receiving, by the transmitter circuit, a pre-issued acknowledgement for the different second data packet to be transmitted before the last data unit of the first data packet has been transmitted to the first receiver;
incrementing a different second receiver-specific credit counter for the second receiver in response to receiving the pre-issued acknowledgement for the different second data packet to be transmitted;
receiving, by the transmitter circuit, an indication that the last data unit of the first data packet has been consumed by the first receiver;
incrementing a first receiver-specific credit counter in response to receiving the indication that the last data unit belonging to the first data packet has been consumed by the first receiver; and
sending a first data unit belonging to the second data packet to the different second receiver using credits of the second receiver-specific credit counter incremented due to receiving the pre-issued acknowledgement for the second data packet to be transmitted.

9. The method of claim 8, wherein the transmitter circuit comprises a plurality of credit counters, and further comprising reassigning each credit counter to a different respective receiver after a respective data packet is transmitted.

10. The method of claim 8, wherein the second receiver of the processor is a different component of the processor than the first receiver of the processor.

11. The method of claim 8, wherein the processor further comprises a line buffer, and wherein the first receiver is the line buffer.

12. The method of claim 8, wherein receiving the pre-issued acknowledgement for the second data packet to be transmitted comprises receiving the pre-issued acknowledgement for the second data packet to be transmitted before sending any data units of the first data packet to be transmitted.

13. The method of claim 8, further comprising incrementing the credits of the second receiver-specific credit counter due to receiving the pre-issued acknowledgment whenever the first receiver of the processor is a different component than the second receiver of the processor.

14. The method of claim 8, further comprising sending interleaved data units to the first receiver and the second receiver using the first receiver-specific credit counter for data units belonging to the first data packet and the second receiver-specific credit counter for data units belonging to the second data packet respectively.

15. A processor, comprising:
a network implementing a credit counter protocol that requires each sender to receive an acknowledgement from a receiver for a data packet to be transmitted before the sender sends data units belonging to the data packet;
one or more processing cores coupled to the network; and
a transmitter circuit coupling a first processing core of the one or more processing cores to the network, the transmitter circuit being configured to transmit data units output by the first processing core into the network, the transmitter circuit comprising means for:
initiating transmitting a first data packet to a first receiver of the processor,
providing a request for a different second data packet to be transmitted to a different second receiver of the processor before a last data unit of the first data packet has been transmitted to the first receiver,
receiving a pre-issued acknowledgement for the different second data packet to be transmitted before the last data unit of the first data packet has been transmitted to the first receiver,
incrementing a different second receiver-specific credit counter for the second receiver in response to receiving the pre-issued transaction acknowledgement for the different second data packet to be transmitted,
receiving an indication that the last data unit of the first data packet has been consumed by the first receiver,
incrementing a first receiver-specific credit counter for the first receiver of the first data packet in response to receiving the indication that the last data unit belonging to the first data packet has been consumed by the first receiver, and
sending a first data unit belonging to the different second data packet to the different second receiver using credits of the second receiver-specific credit counter incremented due to receiving the pre-issued acknowledgement for the different second data packet to be transmitted.

* * * * *

UNITED STATES PATENT AND TRADEMARK OFFICE
CERTIFICATE OF CORRECTION

| | |
|---|---|
| PATENT NO. | : 10,872,393 B2 |
| APPLICATION NO. | : 15/595242 |
| DATED | : December 22, 2020 |
| INVENTOR(S) | : Redgrave et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 100 days.

Signed and Sealed this
Twenty-second Day of November, 2022

*Katherine Kelly Vidal*

Katherine Kelly Vidal
*Director of the United States Patent and Trademark Office*